United States Patent [19]

Roy et al.

[11] Patent Number: 4,876,597
[45] Date of Patent: Oct. 24, 1989

[54] VIDEO OBSERVATION SYSTEMS

[75] Inventors: Bernard J. J. Roy; Lorne D. O'Connor, both of Laval; Philippe F. Rioux, Boucherville, all of Canada; Donald A. Dingle, Burlingame, Calif.; Andre L. Raymond, Ste. Therese, Canada

[73] Assignee: ADT Security Systems, Inc., Parsippany, N.J.

[21] Appl. No.: 233,711

[22] Filed: Aug. 18, 1988

Related U.S. Application Data

[63] Continuation-in-part of Ser. No. 93,241, Sep. 4, 1987.

[51] Int. Cl.$^4$ .................... H04N 7/04; H04N 7/18
[52] U.S. Cl. ..................... 358/141; 358/108
[58] Field of Search ............. 358/141, 108, 133, 135, 358/136, 260, 12, 160, 93

[56] References Cited

U.S. PATENT DOCUMENTS

| | | | |
|---|---|---|---|
| 4,125,862 | 11/1978 | Catano | 358/140 |
| 4,161,000 | 7/1979 | Cleveland | 358/108 |
| 4,222,076 | 9/1980 | Knowlton | 358/263 |
| 4,261,018 | 4/1981 | Knowlton | 358/263 |
| 4,264,927 | 4/1981 | Raymond et al. | 358/108 |
| 4,348,693 | 9/1982 | Cauldwell | 358/140 |
| 4,400,717 | 8/1983 | Southworth et al. | 358/13 |
| 4,414,580 | 11/1983 | Johnsen et al. | 358/260 |
| 4,646,134 | 2/1987 | Komatsu et al. | 358/11 |
| 4,654,484 | 3/1987 | Reiffel et al. | 379/53 |
| 4,660,096 | 4/1987 | Arlan et al. | 358/310 |
| 4,672,444 | 6/1987 | Bergen et al. | 358/140 |

OTHER PUBLICATIONS

M. Kunt, "Source Coding of X-Ray Pictures," IEEE Trans. on Biomedical Engineering, vol. BME-25, No. 2, Mar. 1978, pp. 121-138.

"The Most Accurate & Cost Effective Method of Inventory Control Ever," Video Masters Incorporated, Kansas City, Mo.

"Video Car Identification System," Video Masters Inc., Kansas City, Mo.

M. Rabbani, "Digital Image Compression and Restoration," The Society for Imaging Science and Technology, Tutorial T60, Jan. 11, 1988.

Primary Examiner—James J. Groody
Assistant Examiner—Michael D. Parker
Attorney, Agent, or Firm—Charles B. Smith; Robert R. Jackson

[57] ABSTRACT

A scene to be monitored (e.g., at a remote location or at a later time) is captured as a series of still images. These images are digitally encoded and stored in a digital memory for subsequent retrieval and viewing. If the scene includes a moving object (e.g., the side of a moving freight train), the images may be taken so that they are substantially mutually exclusive and collectively exhaustive of the moving object. During playback, two or more adjacent images may be displayed adjacent to one another so that any feature partly present in adjacent images is visible as a whole. If the observer is at a location remote from the point at which the images are taken, various techniques can be used to facilitate transmission of the image information (preferably in digital form) via relatively low-cost transmission links such as voice-grade telephone lines.

42 Claims, 27 Drawing Sheets
Microfiche Appendix Included
(8 Microfiche, 744 Pages)

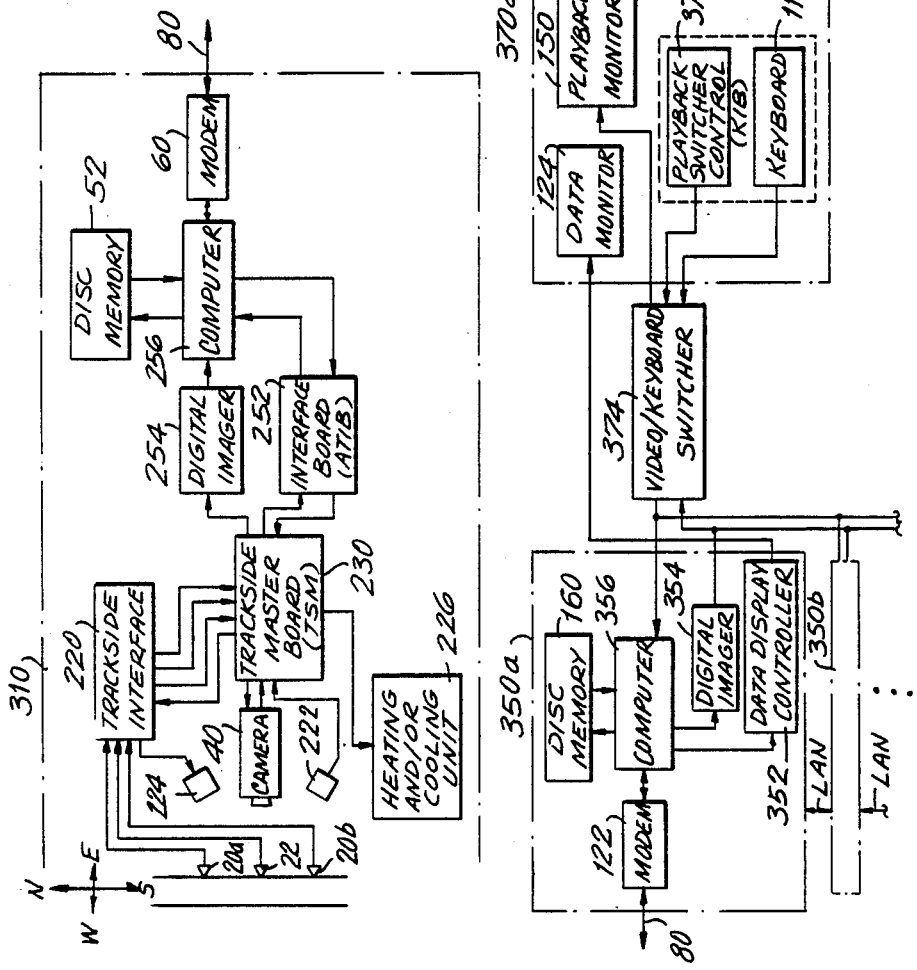

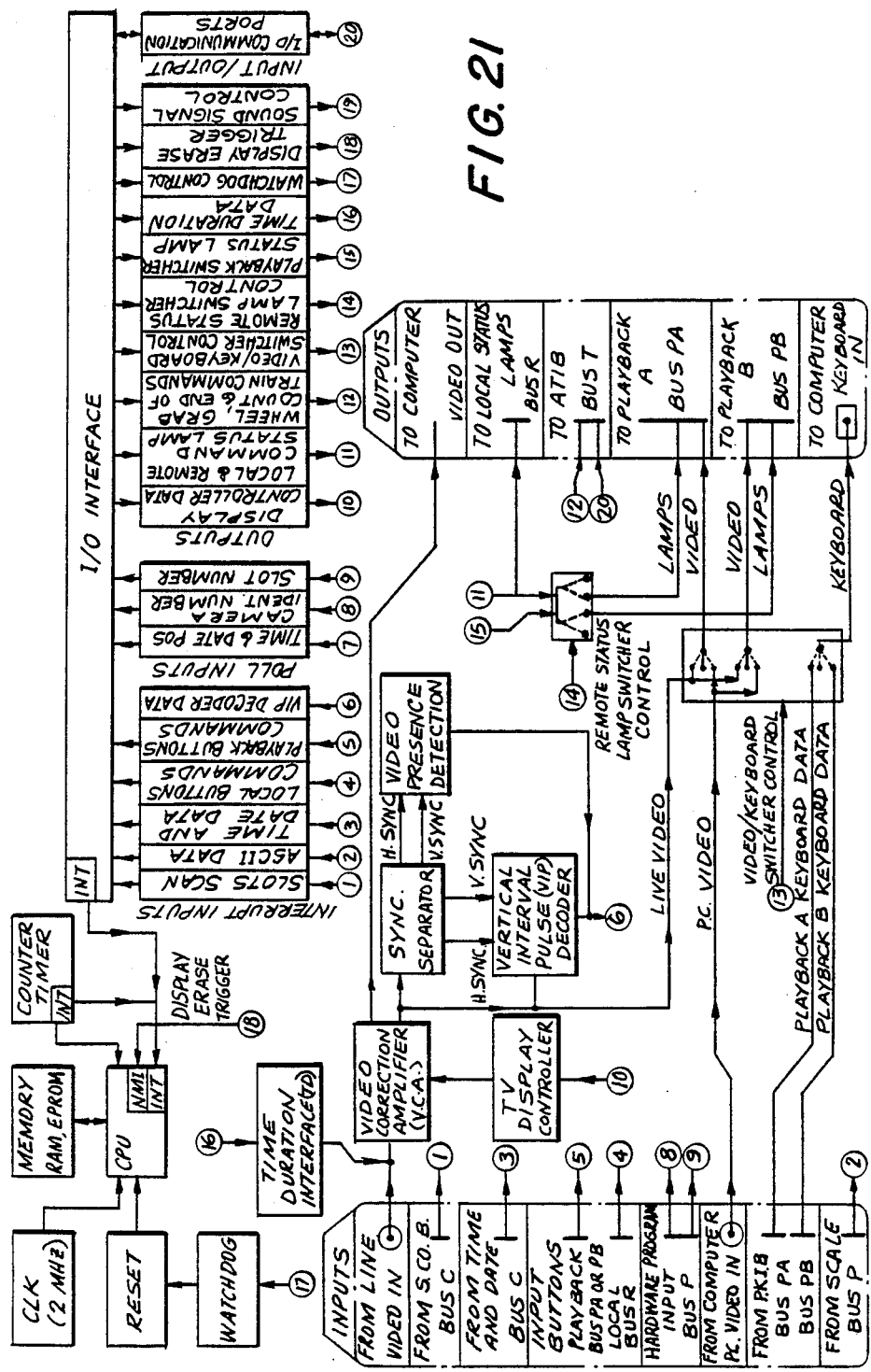

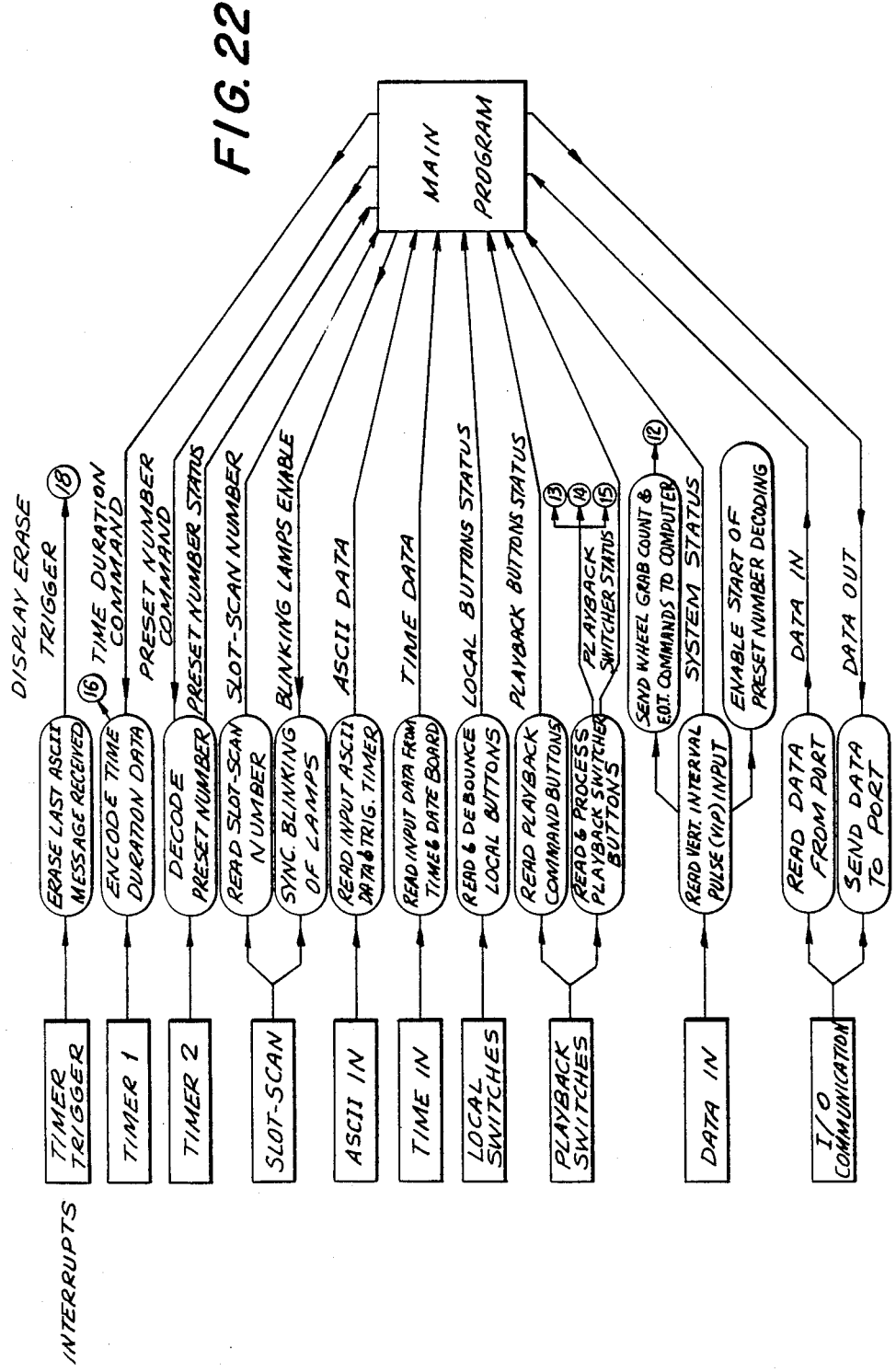

LOCAL & REMOTE COMMAND LAMPS
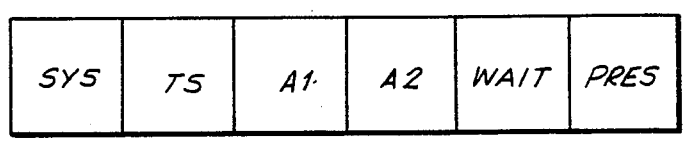
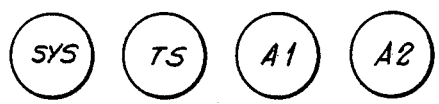
FIG. 33
REMOTE SWITCHER LAMPS
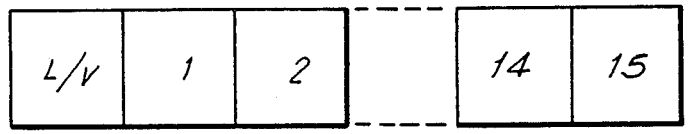
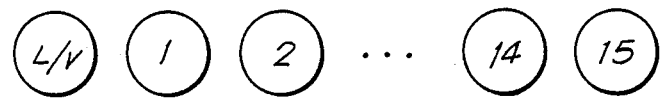
FIG. 34

VIDEO OBSERVATION SYSTEMS

This application is a continuation-in-part of U.S. Pat. application Ser. No. 93,241, filed Sept. 4, 1987.

A microfiche appendix, comprising 8 microfiche having a total of 744 frames, is a part of this specification.

BACKGROUND OF THE INVENTION

This invention relates to video observation systems, and more particularly to systems for recording scenes or objects for subsequent viewing by an observer, especially (although not necessarily) by an observer who is at a substantial distance from the scenes or objects. If such substantial distances are involved, then the systems of this invention facilitate the use of relatively low-cost transmission media between the original scenes or objects and the observer.

Although this invention has many other possible uses, the invention will be fully understood from an explanation of its use in identifying moving railroad freight cars, especially (although not necessarily) at locations remote from the observer required to make the identification.

Raymond et al. U.S. Pat. No. 4,264,927 (which is hereby incorporated by reference herein) shows a freight car identification system in which a remote track-side television-type camera is connected via a video signal transmission line to a centrally located videotape recorder. The system is automatically activated when a train approaches the camera and, while activated, videotapes a continuous side view of the train as it passes. As soon as the train has passed, the system shuts itself off until the next train approaches. At any convenient time, the operator of the system ("the observer") removes the recorded videotape from the recorder and plays it back on a playback machine in order to identify the freight cars in the train from the letters and numbers painted on the sides of the cars.

The system shown in the '927 patent works well and has achieved wide market acceptance. In some situations, however, it is desired to locate the camera at a considerable distance from the observer. In those instances it is usually quite costly—sometimes prohibitively costly—to provide the high-grade video communications link required between the camera and the videotape recorder. For example, railroads would frequently like to locate the camera many miles—sometimes 100 or more miles—from the observer. This may reduce the number of observation points a railroad needs by allowing greater centralization of the observation function. It may also reduce the number of employees required as observers. Heretofore, however, the high cost of long, video-grade communications links has been a major disadvantage of such otherwise desirable system configurations.

Even if the distances involved are relatively small (so that providing high-grade video communications links is not a problem) or if high-grade video communications links are available, videotape-based systems may have some disadvantages. For example, videotape systems have many mechanical parts which have relatively high maintenance requirements. The videotapes themselves are subject to wear and degradation. Videotape systems cannot operate unattended for extended periods of time because an operator is frequently required to change tapes. Tape speed is not dependent on train speed so that considerable amounts of tape are essentially wasted when recording slow-moving trains. Videotape is a linear recording medium, so that it is relatively difficult to view images out of order or at random. It is also not possible to simultaneously record and play back the same tape.

In view of the foregoing, it is an object of this invention to provide improved video observation systems.

It is another object of this invention to provide remote video observation systems which do not require high-grade communications links between the remote camera and the central observer.

It is still another object of the invention to provide improved remote freight car identification systems.

SUMMARY OF THE INVENTION

These and other objects of the invention are accomplished in accordance with the principles of the invention by providing video observation systems in which selected "still" images from the video signal produced by a video camera are digitized and stored on a digital data storage medium such as a disc memory. When the observer wishes to observe the stored video data, the data for an image to be viewed is retrieved from the memory and displayed at the observer's location.

The still images selected for storage in the memory are preferably representative of the scene in the field of view of the video camera. For example, if that scene includes a moving object such as the side of a freight train, the still images are preferably taken at intervals which result in images that are substantially mutually exclusive but collectively exhaustive of the side of the train. This is done by monitoring the motion (e.g., the speed) of the train and causing an image to be stored each time a length of train equal to the width of the field of view of the camera has passed the camera. Because a feature to be observed (e.g., a freight car identifying number) may be split between two (or more) successive still images, the display equipment preferably includes means for retrieving from the memory the data for two (or more) successive images and displaying a composite image including portions of such two (or more) images. This enables a feature split between two (or more) images to be viewed as a whole, thereby greatly facilitating the recognition of such features.

If the observer is located a long way from the camera, the system facilitates the use of relatively low-cost transmission media (e.g., a voice-grade telephone line) between the location of the camera and the location of the observer. (Of course, if higher-grade transmission lines are available, they can also be used.) Any of several transmission techniques can be employed to make it possible to use such low-cost transmission media. In one embodiment, for example, the most significant bit of each pixel-representing byte is sent first, and the resulting high-contrast image component is displayed for observation by the observer. In many instances, this one high-contrast image component is sufficient to enable the observer to see the required information in the original scene (e.g., the letters and numbers painted on the side of a freight car). If that is the case, no further image components need be transmitted for that scene and the system can begin to transmit the most significant bit data for the next scene. This greatly reduces the time and/or bandwidth required to transmit the video information, and contributes to the ability of the system to satisfactorily employ relatively low-grade transmission media. In addition, time and/or bandwidth requirements may be further reduced by using data compression techniques on the image component data prior to transmission. Such compression is typically highly effective on high-contrast image data such as the above-mentioned most significant bits because that data tends to be highly compressible. Time and/or bandwidth requirements can be still further reduced by transmitting only a portion of the image (e.g., in the case of the freight car identification embodiment, the horizontal band most likely to contain the car-identifying numbers).

If the most significant bit data is not sufficient to enable the observer to see the required information in the original scene, the system transmits the next most significant bit from each pixel-representing byte. Once again, data compression and/or the field-of-view limitations mentioned at the end of the preceding paragraph can be employed to reduce the amount of data that must be transmitted. At the receiver, the next most significant bit data is added to the previously transmitted most significant bit data to increase the number of image gradations (e.g., "gray levels" in monochromatic systems) displayed to the observer. Once again, this may be sufficient to enable the observer to see the required information in the original scene, and further transmission of data for that scene can be avoided. If not, however, the process of sending successive, increasingly less significant bits from each pixel-representing byte can be continued until the observer has sufficient information about the original scene or until all data regarding that scene has been transmitted.

In another embodiment, a predetermined portion of the data for each image is initially transmitted from a memory located near the camera to another memory located near the observer. The amount of data thus transmitted is preferably selected to be the amount which can be transmitted in a relatively short time but which will be sufficient to satisfy the observer's needs with respect to at least a substantial percentage of the images transmitted. After this initial transmission, the observer observes the images by retrieving the partial image data from the memory at the observer's location. If the partial data for any image is not sufficient, additional data for that image is transmitted from the memory located near the camera.

Further features of the invention, its nature and various advantages, will be more apparent from the accompanying drawings and the following detailed description of the invention.

BRIEF DESCRIPTION OF THE DRAWINGS

FIG. 10 illustrates another typical display produced by the apparatus of FIG. 6.

FIG. 11 is a schematic block diagram of a third illustrative embodiment of the invention.

FIG. 21 is a schematic block diagram of an illustrative embodiment of yet another portion of the apparatus shown in FIG. 6.

FIGS. 22-25 are flow charts of illustrative software suitable for execution on the computers shown in FIG. 6.

FIGS. 33 and 34 are simplified block diagrams of buttons (and associated lamps) shown in FIG. 26.

DETAILED DESCRIPTION OF THE INVENTION

As has been mentioned, the principles of this invention can be used in many video signal transmission applications. The invention will be fully understood, however, from an explanation of its application to freight car identification systems. It will be noted that various features of the invention can be embodied in various ways to meet the requirements of various situations. To illustrate this, three representative embodiments of the invention will be described below. The first embodiment is a remote system in which data for each image is transmitted one bit-plane at a time from the location of the camera to the location of the observer until the observer has sufficient information about that image and therefore terminates data transmission for that image. The second embodiment is a local system in which the observer is relatively close to the camera (or in which real-time transmission of analog video signals between the location of the camera and the observer is not a problem). The third embodiment is another remote system in which a portion of the data for each image is initially transmitted from a memory at the location of the camera to another memory at the location of the observer, and additional data for certain images is transmitted from the memory at the location of the observer only if the observer needs and therefore requests that additional data.

A. First Illustrative Embodiment

Figure 1:
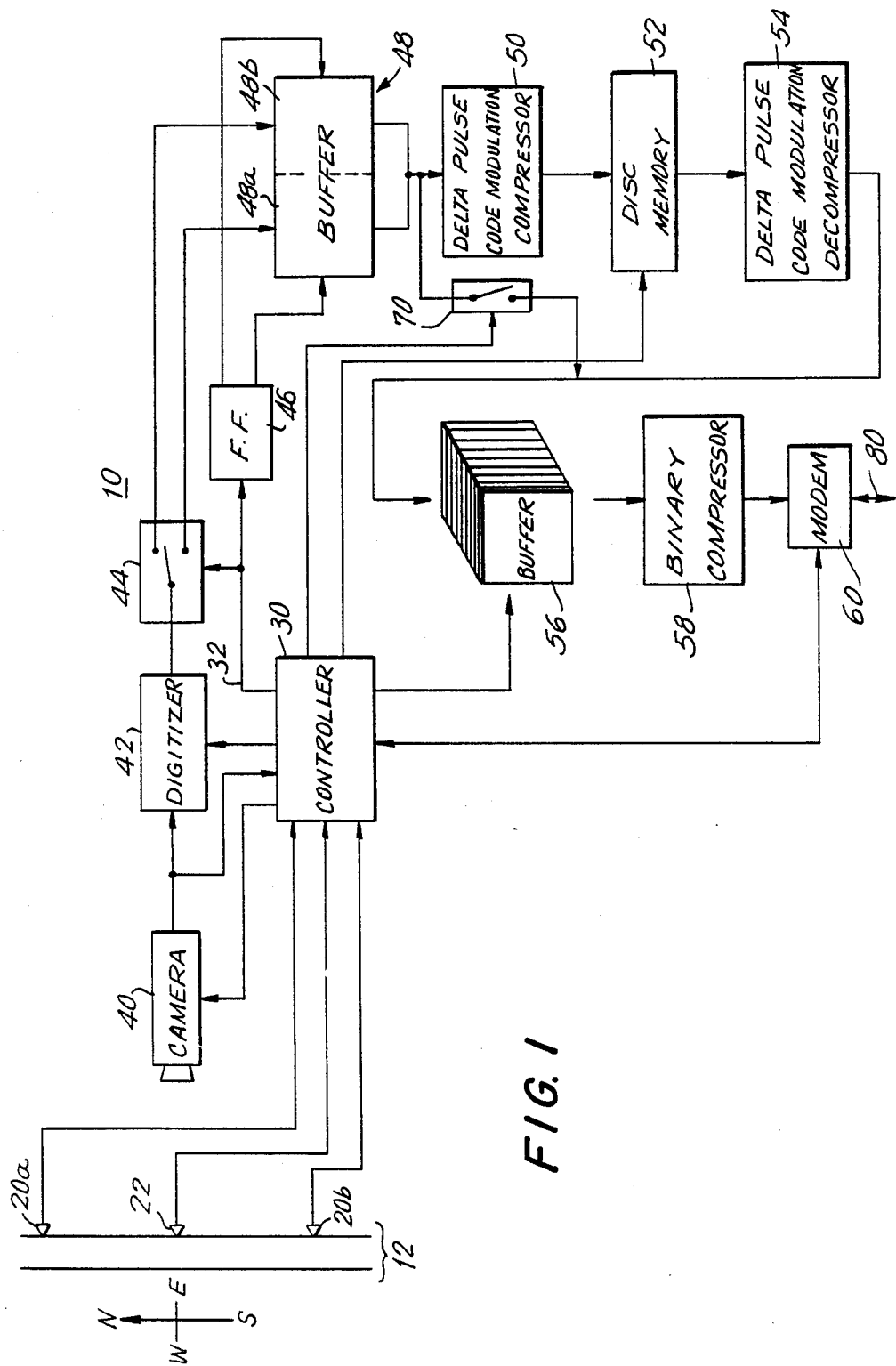
FIG. 1 is a schematic block diagram of the apparatus associated with a remote video camera in a first illustrative embodiment of the invention.

FIG. 1 shows the portion 10 of the freight car identification system apparatus which is located at or near the point along railroad track 12 at which the freight cars in passing trains are to be identified from the ordinary letters and numbers painted on their sides.

Sensor assembly 20a alerts the system to the approach of a train moving south along track 12 (compass directions are entirely arbitrary), while sensor assembly 20b alerts the system to the approach of a train moving north. In response to a signal from either of sensor assemblies 20, controller 30 starts camera 40 and the other components responsive to the video output of camera 40. Sensor assembly 22 produces an output signal pulse each time a railroad wheel passes that location. From the output signals of sensor assemblies 20 and 22 (and, if necessary, other similar sensor assemblies) controller 30 determines such parameters as train presence, train speed, train direction, and wheel count. Suitable sensor arrangements and controller apparatus for performing these functions shown, for example, in the abovementioned '927 patent. If desired, most or all of the functions of controller 30 may be performed by a suitably programmed, conventional, digital micro- or minicomputer.

Camera 40 may be a conventional, high-speed, black and white, video camera. Suitable cameras and camera arrangements are described, for example, in the '927 patent. Another possible type of camera is a conventional charge coupled device ("CCD") camera with a variable integration shutter.

Camera 40 is aimed at the side of track 12 and is focused on the side of a train passing on that track. If auxiliary lighting is required, it can be provided and operated as described in the '927 patent. Although other parameters may be employed, camera 40 may be illustratively positioned so that approximately 15 horizontal feet of the side of a train on track 12 is within the field of view of the camera.

As will be more apparent as the description proceeds, the apparatus of this invention operates by transmitting to the observer (FIG. 2) a succession of "still" images of the side of the train. In order for these stills to collectively capture the entire side of the train, one still must be taken at least each time a length of train equal to the horizontal field of view of camera 40 has passed the camera. In order to do this, controller 30 uses the train speed information (determined as described above) to produce an output signal pulse on lead 32 at least each time a length of train equal to the horizontal field of view has passed camera 40. (If train speed is not known with sufficient precision, it may be desirable to provide a slight overlap between adjacent images.) The signal on lead 32 is used to control switch 44 and flip-flop 46 as described in detail below.

Once activated as described above, camera 40 operates continuously to produce a conventional analog video output signal (e.g., a standard RS 170 signal) of the scene before it. If desired, controller 30 may stop camera 40 if the controller (using sensor assemblies 20 and 22) detects that the train has stopped and/or reversed direction. In that event, controller 30 may restart the camera when the train resumes its original direction of travel and (if reverse motion occurred) after the portion of the train previously viewed by camera 40 has again passed the camera. The latter of these functions can be based in part on the above-mentioned wheel count data. Of course, controller 30 also stops camera 40 when the entire train has passed the camera. Once again, suitable sensor and controller apparatus for performing these functions is shown, for example, in the '927 patent.

Assuming that the output signal of camera 30 is a standard RS 170 signal, each "frame" (occupying 1/30th of a second) comprises 525 horizontal scan lines, not all of which include video information because some are used for video control signals (e.g., the so-called vertical interval). The lines are scanned alternately from top to bottom, so that each frame also comprises two "fields," each occupying 1/60th of a second. The first field includes horizontal scan lines 1, 3, 5, 7, 9, etc., while the second field includes horizontal scan lines 2, 4, 6, 8, 10, etc. It has been found sufficient for freight car identification to use only one of the two fields associated with any frame. In addition, this automatically eliminates any blurring that might result from using both fields when imaging fast-moving trains. Accordingly, each half of buffer 48 (described in more detail below) is only large enough to hold the data associated with the visible portion of one field (i.e., 240 horizontal scan lines, each of which includes 256 picture elements or pixels). It will be apparent to those skilled in the art, however, how the principles of this invention can be extended to systems requiring utilization of both fields of a frame.

The analog output signal of camera 40 is applied to digitizer 42, which preferably employs conventional flash analog-to-digital conversion to sample each horizontal scan line 256 times and produce an 8-bit (1-byte) digital equivalent value of each sample. Accordingly, a digital gray scale having 256 gradations or gray levels is employed.

The digital output signal of digitizer 42 is applied to switch 44, which changes state each time controller 30 produces an output signal on lead 32 as described above (i.e., each time a length of train equal to the horizontal field of view of camera 40 has passed the camera). Accordingly, switch 44 typically remains in one position for several frames. This means that the digital data associated with all of those frames is directed to one of the two halves of buffer 48. As mentioned above, each half of buffer 48 can store the data for one field. Accordingly, the data in the half of buffer 48 to which data is currently being directed is repeatedly updated as long as new data is being directed to that half of the buffer.

When controller 30 produces an output signal on lead 32 (thereby indicating that a length of train equal to the field of view of camera 40 has passed the camera, and that it is accordingly time to capture another still image of the side of the train), switch 44 changes state to direct subsequent data into the other half of buffer 48. This "freezes" or prevents further updating of the data in the first half of the buffer. At the same time, flip-flop 46 changes state to cause the half of buffer 48 which is now frozen to begin to dump its contents to delta pulse code modulation compresser 50. Advantageously, controller 30 can only produce a pulse on lead 32 in synchronization with the vertical interval in the output signal of camera 40 so that the operation of elements 44, 46, and 48 is thereby synchronized with the video signal.

Because each field contains 240 horizontal scan lines of 256 pixels or bytes, each field requires 61,440 bytes. Many freight trains include 100 or more cars and are therefore a mile or more long. Because a still picture must be taken every 15 feet in order to record the entire side of the train, it may be necessary to take 350 or more stills of a full-length train. Thus it would not be at all uncommon to require 21M bytes or more to store all the stills for a typical train. This is not an excessive amount of storage by present-day standards in view of the fact that ordinary personal computers are available with disc memories capable of storing 60M bytes or more. However, to conserve disc space and to speed the transfer of image data to and from the disc, any of a number of conventional data compression techniques can be applied to the output signal of buffer 48. The preferred data compression technique is so-called delta pulse code modulation compression which is performed by delta pulse code modulation compressor 50. Compressor 50 converts successive buffer 48 output bytes to half-bytes or nibbles based on the amount of change between successive bytes. This reduces the data for each field from 61,440 bytes to 30,720 bytes, thereby conserving disc space and speeding transfer of the data to disc memory 52.

The compressed data output of compressor 50 is stored in preferably conventional disc memory 52 under the control of controller 30, which maintains a list of the storage locations of successive images. Elements 54, 56, and 58, which are associated with retrieving image data from disc memory 52, are typically inoperative while data is being stored on the disc.

After all the image data for a train has been stored in disc memory 52, controller 30 typically turns off camera 40 and the associated image-gathering apparatus. The apparatus of FIG. 1 can then either wait for the operator of the system to interrogate it as to whether or not there is any new image data, or controller 30 can send a message via modem 60 and transmission line 80 to the apparatus of FIG. 2 to alert the operator to the fact that new train data has been gathered and is ready for transmission to the operator.

Figure 2:
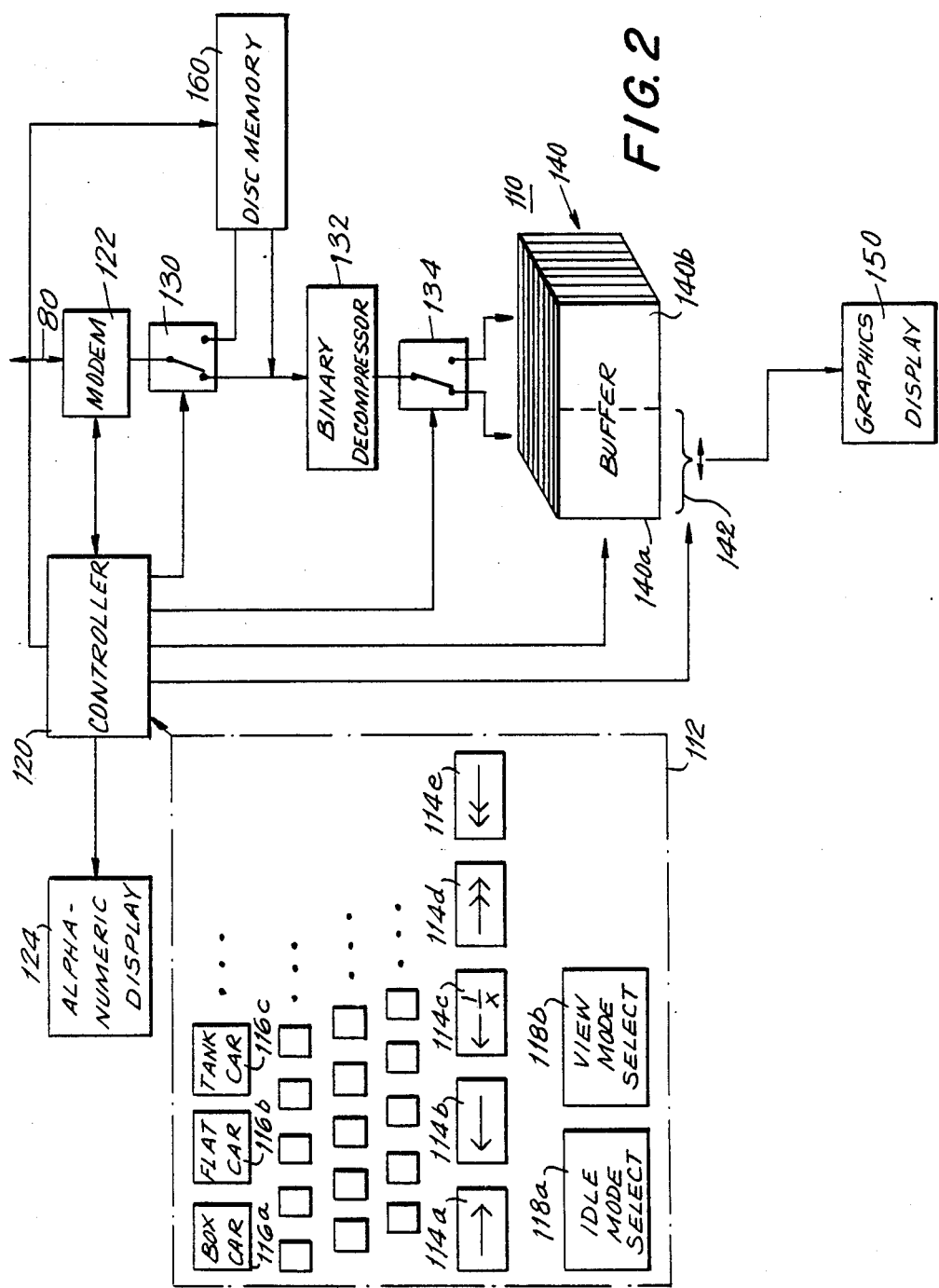
FIG. 2 is a schematic block diagram of the apparatus associated with the observer's location in the embodiment of FIG. 1.

When the operator, who is at the location of the apparatus 110 shown in FIG. 2 (typically a considerable distance (e.g., many miles) from the apparatus of FIG. 1) is ready to view the image data gathered as described above, the operator operates the keys on keyboard 112 required to cause controller 120 to send an appropriate message to controller 30 via modem 122, transmission line 80, and modem 60. Any of several different types of messages can be exchanged in this way by controllers 30 and 120, and corresponding messages are displayed on alphanumeric display 124 for the benefit of the operator. For example, the operator may request that controller 30 report the status of apparatus 10 (e.g., whether the camera is on or off, whether any new train data has been gathered since the last interrogation, how much disc memory is still available, whether or not any faults have been detected in apparatus 10, etc.). Similarly, the operator may request that controller 30 report non-video data gathered by apparatus 10 (e.g., the date and time of passage of each train for which data has been gathered, the direction of travel of each such train, the wheel count of each such train, etc.). In response to these and other similar inquiries, controller 30 sends back appropriate answers via modem 60, transmission line 80, and modem 122, and controller 120 decodes those answers and causes appropriate messages to be displayed on preferably conventional alphanumeric display 124. If desired, most or all of the functions of controller 120 can be performed by a suitably programmed, conventional, digital micro- or minicomputer.

Assuming that apparatus 10 has captured and stored in disc memory 52 video information which the operator wishes to see, the operator sends additional messages to cause controller 30 to initiate transmission of that video information. For example, if a new train ("Txx," where T is the train message code letter and xx is the number of the train (a relative number assigned by controller 30)) has been recorded by apparatus 10 and the operator wishes to view the stills of that train, the operator uses keyboard 112 to cause controller 120 to send a message to controller 30 instructing controller 30 to locate the video image data for train Txx in disc memory 52 and to begin to transmit that data to the operator as will now be described in detail.

Controller 30 locates the data for the first still of train Txx in disc memory 52 and causes that data to be read out and applied to delta pulse code modulation decompressor 54. Decompressor 54 is merely the reverse of compressor 50. Accordingly, decompressor 54 restores the image data to substantially the form that it had in buffer 48 (i.e., one byte per pixel). The resulting data is stored in buffer 56, which may be a conventional computer-type memory.

Buffer 56 may be thought of as a three-dimensional data storage device made up of eight parallel planes (referred to for convenience herein as "bit-planes"). Each bit-plane stores one bit from each byte of the image data output by decompressor 54. For example, the most significant bit of each byte may be thought of as being stored in the forwardmost bit-plane ("the most significant bit-plane"), the next most significant bit of each byte may be thought of as being stored in the next-to-forwardmost bit-plane ("the second most significant bit-plane"), and so on, with the least significant bit of each byte being thought of as stored in the rearwardmost bit-plane ("the least significant bitplane").

When buffer 56 is fully loaded with the data for a still (i.e., one field of 240 horizontal scan lines of 256 pixels each), controller 30 causes only the data from the most significant bit-plane to be read out. Note that this is exactly one-eighth of the total data stored in buffer 56, or the equivalent of only 7,680 bytes rather than the full 61,440 bytes stored in buffer 56. This most significant bit-plane data is applied to binary compressor 58 which employs any of several conventional data compression techniques to reduce the number of bits (or bytes) required to represent the applied data. For example, a conventional run-length compression technique can be used in which each successive numerical value represents a corresponding number of consecutive ones or zeros in the original data stream (e.g., if the original data stream included 22 ones followed by 55 zeros, the corresponding run-length representation would be 22, 55). Because the data in the most significant bit-plane tends to be very high-contrast image data (i.e., many long strings of consecutive ones or zeros), this data is highly compressible using this technique. (To help maintain the effectiveness of run-length compression when the consecutive strings become shorter and/or when there are many short strings, a modified Hoffman coding can be applied to the compression data. This technique employs a small number of bits to code low counts and more bits to code larger counts (e.g., two bits for counts of one or two, and 12 bits for counts of 64.)) These techniques make possible compression factors of 20 to 1 or better, especially with image data for large objects such as railroad freight cars. Accordingly, binary compressor 58 might be able to compress the 7,680 bytes associated with the most significant bit plane to a mere 384 bytes (assuming a compression factor of 20 to 1). Assuming, for example, that transmission line 80 is a voice-grade, telephone-type transmission line, and that modems 60 and 122 are conventional packetized ensemble modems (e.g., Trailblazer model modems available from Telebit Corporation of Marietta, Ga., and rated for up to 18,000 bits per second) providing full duplex operation and having an effective throughput of approximately 14,000 bits per second, 384 bytes can be transmitted via line 80 in about 22 seconds.

At the receiver (FIG. 2), controller 120 causes switch 130 to direct the incoming video data to binary decompressor 132, which operates on the data to reverse the effect of compressor 58. Accordingly, decompressor 132 restores the data to its original bit-plane form. Switch 134, under the control of controller 120, directs the restored bit-plane data to one of the two halves of buffer 140, which (like buffer 56) may be a conventional computer-type memory.

Each half of buffer 140 can be thought of as similar to buffer 56. Assuming that data for the first image of train Txx is to be stored in buffer half 140a, controller 120 causes the most significant bit-plane data to be stored in the most significant bit-plane portion of buffer half 140a. At the same time, controller 120 controls the application of buffer 140 data to preferably conventional graphics display 150 so that only the data in buffer portion 140a is applied to the graphics display. Accordingly, the very high-contrast image which results from having only the most significant bit-plane data applied to display 150 will appear on that display. It has been found that with only this much video information, at least approximately 50% of railroad freight cars can be identified from the letters and numbers painted on their sides. If the operator can identify the freight car from this image, the operator depresses appropriate keys on keyboard 112. For example, if the operator already has the intended consist list for train Txx and the car image he or she sees agrees with that list, he or she may merely press an "acknowledge" key on keyboard 112. On the other hand, if the operator does not have a consist list and is being required to gather the data for such a list, he or she types in the car-identifying letters and numbers seen on display 150. It is also possible that the operator may be able to tell from the most significant bit-plane image on display 150 that this particular still contains no car-identifying letters or numbers at all. In that case, the operator will typically depress one of keys 114 (i.e., "forward one frame" key 114a, "back one frame" key 114b, "back a fractional frame" key 114c, "fast forward" key 114d, or "fast reverse" key 114e). Any of the foregoing keyboard operations indicates that the operator is satisfied with the level of detail visible in the current image. Controller 120 therefore sends an appropriate message to controller 30 to stop the transmission of data from buffer 56. In addition, if the key or keys operated by the operator call for transmission of another image, the message from controller 120 to controller 30 causes controller 30 to erase buffer 56 and begin the process of transmitting the next image as described in detail below. On the other hand, if the operator needs or wants more data for the current image, the operator merely waits and that additional data is immediately and automatically transmitted.

Assuming that more data for the current image is to be transmitted, as soon as the most significant bit-plane data in buffer 56 has been transmitted, controller 30 accesses the next or second most significant bit-plane data in that buffer. The data from this bit-plane is processed by elements 58, 60, 80, 122, 130, 132, and 134 as described above and loaded into the second most significant bit-plane in buffer portion 140a. This increases the number of gray levels available for display on display 150 from two (when only the most significant bit-plane data was present in buffer 140) to four, thereby adding more detail to the image on display 150. Although the data from the second most significant bit-plane may not be as highly compressible (in binary compressor 58) as the most significant bit-plane data, it is still typically quite compressible (e.g., by a factor of ten or more). Assuming such a compression factor, even the second most significant bit plane data can be transmitted via transmission line 80 in about half a second.

With the data from two bit-planes driving display 150, it has been found that many of the freight cars which cannot be identified from only one bit-plane can now be identified. If that is the case and the operator is therefore finished with the current frame, he or she operates one or more of the keys on keyboard 112 as described above with similar results. However, if the operator needs still more data from the current frame, he or she does nothing and the system automatically transmits the third most significant bit-plane from buffer 56 to buffer 140a to add yet another level of detail to the image on display 150. The third most significant bit-plane data is somewhat less compressible (in compressor 58) than the previous data, so it may take approximately one second to transmit this portion of the image data. Still more freight cars can be identified with images made up of three bit-planes. However, if three bit-planes are not yet sufficient, the process of sending successive, increasingly less significant bit-planes continues until sufficient information has been transmitted to enable the operator to perform his or her task or until all eight bit-planes have been transmitted. The data for each successive bit-plane is less compressible (in compressor 58) so that transmission of the final bit plane might take 5 or more seconds.

Note that if the principles of this invention were not employed, it would probably take at least about 45 seconds to transmit the data for one field. With this invention, sufficient information about most fields can be transmitted in less than two seconds, and only a very few fields (less than 5 or 10%) will be found to be so indistinct or faint as to require transmission of more than three or four bit-planes.

As mentioned above, as soon as the operator has sufficient information about a particular image, he or she depresses the appropriate key or keys on keyboard 112. This typically causes controller 120 to send a message to controller 30 to erase buffer 56 and (unless transmission is to be halted altogether) to begin transmission of the data for another image. Although other criteria may be used for selection of the next image as described in detail below, in the simplest case the next image transmitted is the next image stored in disc memory 52 (i.e., the image of the portion of the side of the train immediately following the portion for which image transmission was just completed). This would result, for example, if the operator depressed "forward one frame" key 114a on keyboard 112. Assuming that this is the next image to be transmitted, controller 30 retrieves the data for that image from disc memory 52 and begins transmitting it to apparatus 110 exactly as described above for the first image (i.e., one bit-plane at a time, from most significant to least significant). As soon as this transmission begins, controller 120 throws switch 134 so that buffer portion 140b (rather than buffer portion 140a) receives that data. (Controller 120 changes the position of switch 134 each time transmission of a new image begins.) The last image transmitted remains in buffer portion 140a. Controller 120 also controls the application of buffer 140 data to graphics display 150 (i.e., by moving bracket 142 to the right) so that only the data in buffer portion 140b is applied to the display. Thus the same sequence of operations is repeated for this second image as was described above for the first image (i.e., successive bit-planes are transmitted one after another until the operator is satisfied and stops the transmission, or until all of the bit-planes for the image have been transmitted).

Figure 3:
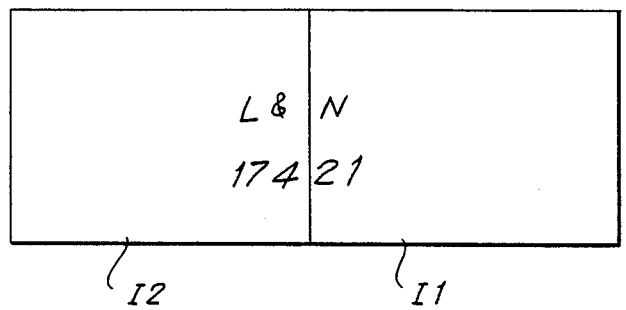
FIG. 3 shows two successive pictures taken by the apparatus of FIG. 1.

It is possible that the identification of a freight car may be split between two adjacent images as suggested in FIG. 3, in which I1 identifies one image of the side of a freight car bearing the identification L&N 17421, and I2 identifies another adjacent image of the side of that car. If the train were travelling from left to right in FIG. 3, picture I1 would be taken and stored first, and then picture I2 would be taken and stored. If the train were travelling in the opposite direction, picture I2 would be taken and stored before picture I1.

Figure 4:
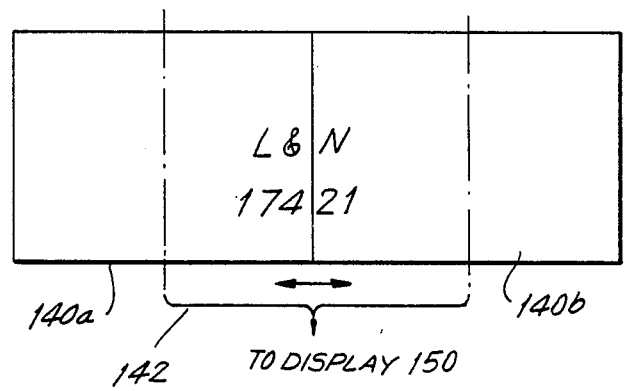
FIGS. 4 and 5 show two possible ways in which the data for the pictures of FIG. 3 may be reconstructed by the apparatus of FIG. 2.
Figure 5:
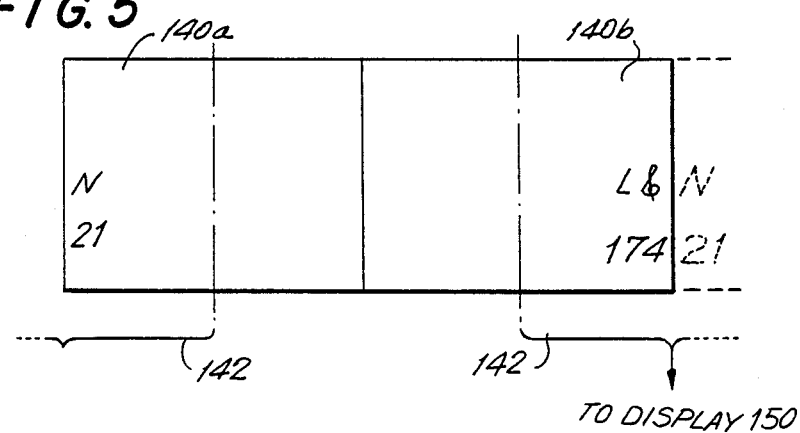

In most such instances of split identifications, a skilled operator can completely and accurately identify the car despite the fact that the identifying information is split and regardless of the order in which the images are presented to the operator. Occasionally, however, the operator may need or want to see the complete car identification in one image. This is accomplished in accordance with the principles of this invention by storing the data for adjacent images in buffer portions 140a and 140b, and using processor 120 to cause appropriate portions of the image data in each buffer portion to be applied to display 150. For example, if images I1 and I2 are respectively stored in buffer portions 140a and 140b as shown in FIG. 4, an unsplit image of the car identification can be produced by displaying on display 150 the portions of the buffer data indicated by bracket 142. Normally the data for display 150 comes entirely from one or the other of buffer portions 140a or 140b. However, when a split image is to be eliminated (after both portions of that image are stored in buffer 140), the operator can use "back a fractional frame" key 114c to effectively cause bracket 142 to step left or right across buffer 140 to gradually delete from display 150 the unwanted portion of the most recently transmitted image and to add to display 150 the contiguous portion of the image transmitted just prior to the most recently transmitted image. Bracket 142 "wraps-around" the extreme opposite ends of buffer 140 as shown in FIG. 5 so that no matter how the images happen to be stored in the buffer, an unsplit image can always be produced on display 150. Each operation of key 114c can cause the displayed image to shift laterally any predetermined fractional amount (e.g., one-tenth of a frame, one-eighth of a frame, one-fourth of a frame, etc.). Note that unlike operation of keys 114a, b, d, and e, operation of key 114c never initiates transmission of additional video information from apparatus 10. All of the required data is already stored in buffer 140. Operation of key 114c does, however, stop transmission of video data from apparatus 10, if such transmission has not already been stopped.

At this point it is appropriate to consider operation of the remaining keys 114. As mentioned above, operation of key 114a usually causes apparatus 10 to begin to transmit data for the image taken immediately after the most recently transmitted image. However, if that data is already stored in buffer 140 because the last key to be operated was "back one frame" key 114b, then the system can be arranged to simply apply that buffer 140 data to display 150. If additional detail regarding that image is now required, transmission of that data from apparatus 10 can be resumed from the point at which it was last interrupted in order to avoid retransmission of the same data.

Operation of "back one frame" key 114b causes display of the image taken just before the image currently being displayed. If the most recently operated key was "forward one frame" key 114a, then the required data will still be present in buffer 140 and can be immediately displayed on display 150 without retransmission from apparatus 10. If more detail regarding that image is required, apparatus 10 can transmit data for that image from the point at which that transmission was last interrupted. On the other hand, if the most recently operated key was key 114d or 114e, then the required image data will either never have been transmitted from apparatus 10 or, if previously transmitted, will have been erased from buffer 140. In either case, the required data is retrieved from disc memory 52 and transmitted to apparatus 110 for display on display 150 exactly as described above.

Operation of "fast forward" key 114d causes controller 120 to send a message to controller 30 to skip over several images (e.g., two) and transmit the image after the skipped images (e.g., the third image from the most recently transmitted one). This allows the operator to skip over images he or she knows contain no car-identifying information or which are otherwise not of interest. "Fast reverse" key 114e operates similarly, but in reverse.

Transmission of video data via transmission line 80 can be speeded up even further in accordance with the principles of this invention by use of keyboard keys 116a, b, c, etc. Although there are exceptions to any such rules, most railroad cars of any one type tend to have their identifying information in about the same place. For example, box car identifications tend to be on the left near the middle of the vertical dimension of the car. Flat car identifications tend to be near the center of the car and quite low because of the nature of the car. Even in mixed freight trains, similar cars tend to be grouped together, and there are many trains in which one type of car predominates.

Keys 116 allow the operator to tell the system what type of car the operator is seeing. For example, if the operator is seeing box cars, the operator can press key 116a; if flat cars, key 116b; etc. In response, controller 120 sends a message to controller 30 which causes apparatus 10 to transmit only the portion of the video image data likely to contain car-identifying information for the specified type of car (e.g., for flat cars a low, vertically narrow "window" or portion of the image; for box cars, a somewhat higher, vertically wider window or portion of the image; etc.). Thus for flat cars there is probably no need to transmit approximately three-fourths of the vertical height of the image. Accordingly, controller 30 causes only the buffer 56 data for the portion of the image that is of interest for flat cars to be transmitted, thereby reducing transmission time for such images by approximately three-fourths. Similarly, for box cars there is probably no need to transmit the extreme upper and lower portions of the image, which may collectively comprise approximately one-half the image. Controller 30 therefore causes only the buffer 56 data for the middle portion of the image to be transmitted, thereby reducing box car image transmission time by approximately one-half.

The type-of-car information which results from operation of keys 116 is also usable in another way in accordance with this invention. When the operator is able to see the identification of a known type of car, it may be possible to avoid transmission of the next one or more images on the basis that the identification of the next car most probably cannot occur in those images. For example, if flat cars are typically 80 feet long with identifications near the center, when a flat car identification is seen in one 15-foot image, at least the next three 15-foot images will almost certainly contain no car-identifying information and can be skipped (i.e., not transmitted from apparatus 10 to apparatus 110). Indeed, if one assumes that cars of any given type are likely to occur in groups, then four images can be skipped after each flat car is identified.

The system can be constructed to perform this type of image skipping automatically. The most recently operated key 116 tells controllers 120 and 30 what type of car is currently being observed. Then as soon as the operator depresses the other keyboard key or keys that tell the system the operator has adequately seen a car identification, the system uses the above-mentioned car-type information to determine how many images to skip. Having made this determination, controller 30 retrieves from disc memory 52 the data for the image immediately after the skipped image or images, and transmission of that data begins as described above. This automatic skipping of uninformative images greatly increases the efficiency of the system. Of course, any image that is skipped can be subsequently viewed, if desired (e.g., by operation of "back one frame" key 114b).

The foregoing describes what may be characterized as the principal mode of operation of the system. The system may also have other operating modes as will now be described.

Whenever there is going to be a period of time when there will be no operator activity at apparatus 110 (e.g., at night, during a meal break, or at any other time when the operator is otherwise engaged), the system can be placed in "idle mode" by operating keyboard key 118a. While in idle mode, the system automatically transfers from disc memory 52 to similar disc memory 160 any image data (or a predetermined portion of any image data) that has not been previously transmitted to apparatus 110. During such idle mode transmissions, controller 120 throws switch 130 so that the incoming data is applied to and stored in disc memory 160. In order to save transmission time, it may be sufficient to transmit only the three or four most significant bit-planes of each image, since it has been found that more than about 90 or 95% of all freight cars can be identified from just that much image data. (If additional data is required for any image, the operator can subsequently retrieve that data from disc memory 52.)

When the operator is again ready to view image data, any data that was transmitted to apparatus 110 during idle mode is retrieved from disc memory 160 without any of the delays associated with transmission of data via transmission line 80. In all other respects, however, the system operates as though the data were being sent from apparatus 10.

Another possible operating mode is so-called "view mode" which is selected by operating keyboard key 118b. View mode enables the operator to see at least some of the pictures currently being taken by camera 40. When view mode is selected, controller 120 sends an appropriate message to controller 30. The next time controller 30 causes buffer 48 to dump data to compressor 50, it also momentarily closes switch 70 so that the data from buffer 48 is also transferred to buffer 56. Thereafter, elements 30, 56, 58, and 60 cause that image data to be transmitted via transmission line 80 exactly as described above. Apparatus 110 causes this data to be displayed on display 150, also exactly as described above. As soon as the operator is satisfied with that image, he or she presses a key or keys on keyboard 112. Controller 120 sends an appropriate message to controller 30, and controller 30 responds by repeating the process of momentarily closing switch 70 the next time buffer 48 is to be dumped. In this way the operator can see selected images produced by camera 40 at very nearly the time that those images were produced.

B. Second Illustrative Embodiment

Figure 6:
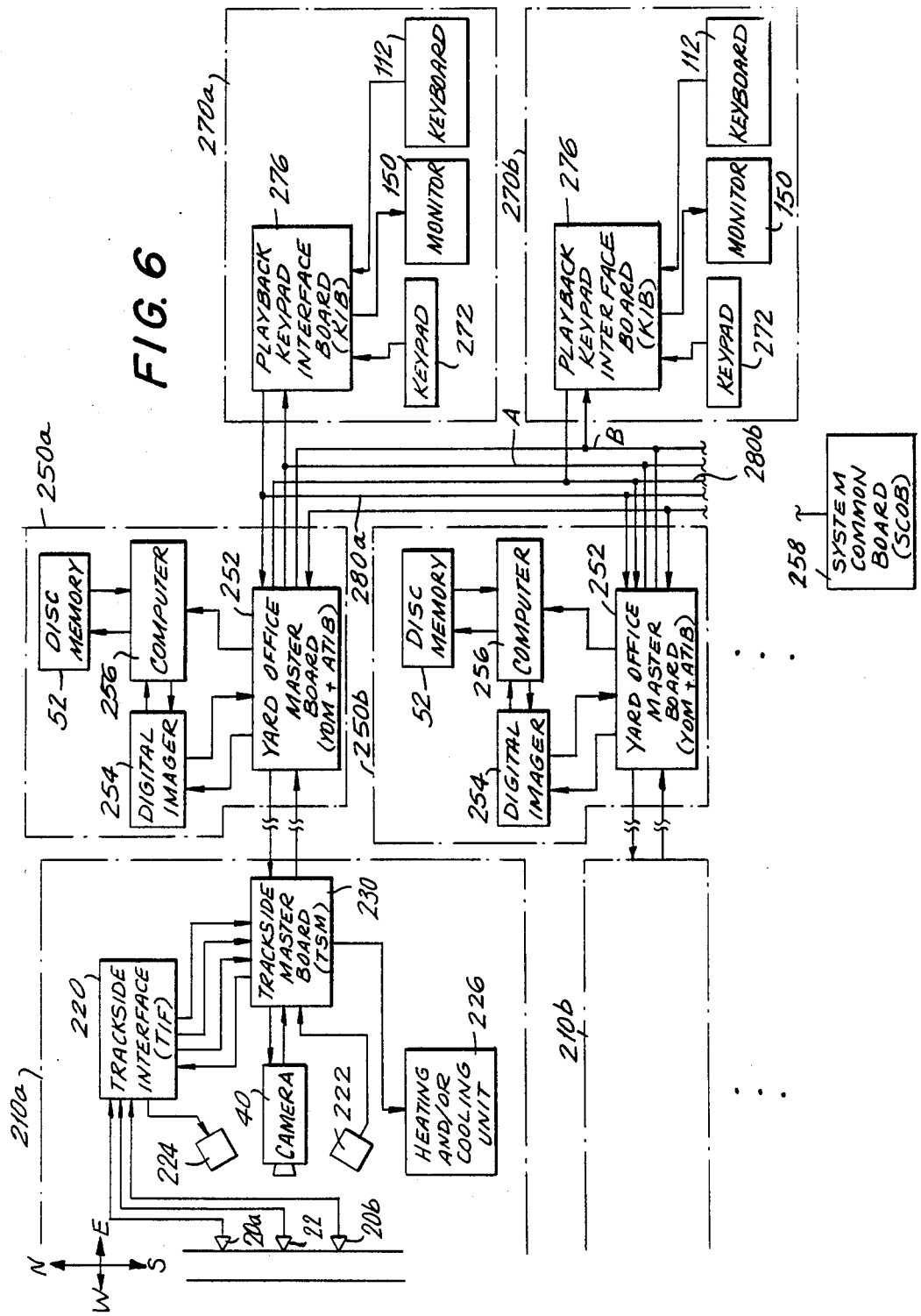
FIG. 6 is a schematic block diagram of a second illustrative embodiment of the invention.

FIG. 6 shows another illustrative embodiment of the invention in which high-grade communications links are available between each trackside installation 210a, 210b, etc., and the location of the observer ("the yard office" or location of all the other elements shown in FIG. 6). All of trackside installations 210 are basically the same, so that only installation 210a is shown in detail and described below. Wheel detectors 20a and 20b and train speed detector 22 are respectively similar to detectors 20 and 22 in FIG. 1. The output signals of all of these detectors are applied to trackside interface board 220, which uses these signals to produce "wheel," "grab," and "end of train" signals applied to trackside master board 230. The "wheel" signal indicates that a wheel has been detected and can be counted if wheel counting is employed in the system. The "grab" signal indicates that a length of train equal to the horizontal field of view of camera 40 has passed and that it is therefore time to capture another still image of the side of the train. And the "end of train" signal indicates that the end of a train has been detected. Light sensor 222 monitors the amount of ambient light in the field of view of camera 40, and if this light is not sufficient for satisfactory operation of camera 40, trackside master board 230 and trackside interface board 220 turn on lights 224. Trackside master board 230 also controls heating and/or cooling unit 226 which controls the temperature environment in which the trackside equipment operates. Camera 40 may be similar to camera 40 in FIG. 1.

The trackside master board 230 in each trackside installation transmits the "wheel," "grab," and "end of train" signals, as well as the analog video output signal of camera 40, to the yard office master board 252 in an associated one of yard office units 250a, 250b, etc. (The "wheel," "grab," and "end of train" signals may be transmitted with the video signal or separate from the video signal as desired.) Control signals produced or transmitted by the yard office unit 250 are transmitted back to the trackside unit via elements 252 and 230 (e.g., to turn camera 40 on or off). Yard office master board 252 applies the analog video output signal from camera 40 to digital imager 254, which converts the analog video signal to digital signals in a manner similar to digitizer 42 in FIG. 1. In fact, assuming that computer 256 is a conventional IBM PC-AT or compatible personal computer, digital imager 254 may be part of the circuitry on an expansion card in that computer (e.g., an Oculus-300 model imaging board commercially available from Coreco of Longueil, Quebec, Canada). In that case, this imaging board performs all the functions of elements 42, 44, and 48 in FIG. 1 under the control of other signals (e.g., the "grab" signal) applied to and/or generated by the remainder of computer 256. Computer 256 periodically dumps the digital video signals to disc memory 52 (similar to disc memory 52 in FIG. 1) in the same way that buffer 48 is periodically dumped to disc memory 52 in FIG. 1. System common board 258 includes circuitry utilized by all of yard office units 250 (e.g., power supply circuitry, time and date logic, etc.).

The apparatus shown in FIG. 6 includes two operator stations 270a and 270b, either of which can be used to view the video information (and possibly other data) collected by any pair of units 210 and 250. For example, operator station 270b (under the control of human operator B) can instruct yard office unit 250a to send it video signals via video bus B, while operator station 270a (under the control of human operator A) can instruct any other yard office unit (e.g., 250b) to send it video signals via video bus A. Each operator station includes a keypad 272 (e.g., a switch box with one switch for each unit 250) for allowing the operator to select the unit 250 that will apply video signals to the associated video bus. The selected unit 250 then also receives and responds to other control signals produced in response to operation of the keyboard 112 (similar to keyboard 112 in FIG. 2) in the associated operator station. Each operator station also includes a playback keypad interface board 276 and video monitor 150 (similar to display 150 in FIG. 2). Each playback keypad interface board 276 can be thought of as a switch for directing the output signals of the associated keypad 272 and keyboard 112 to the associated control bus 280a or 280b, and for directing the video signal from the associated video bus A or B to the associated monitor 150.

Assuming that the system is on, each pair of elements 210 and 250 basically operates automatically (i.e., without operator intervention) to take a series of still images of the side of any passing train and to record those still images in digital form on the associated disc memory 52. The still images thus stored in any disc memory are preferably substantially mutually exclusive and collectively exhaustive of the side of the associated train. This portion of the apparatus is therefore structurally and functionally similar to the portion of the FIG. 1 apparatus down through disc memory 52.

At any time that an operator wants to view all or part of the still images for any train, the operator uses his or her keypad 272 to connect his or her operator station 270 to the unit 250 containing the desired information, and then uses his or her keyboard 112 in a manner similar to that described above in connection with FIG. 2 to retrieve the still images from the selected disc memory 52. The above-described imaging board (including digital imager 254 and parts of computer 256) converts the digital data for each still image retrieved from the associated disc memory back to an analog video signal and transmits that analog video signal via master board 252, video bus A or B, and interface board 276 to the operator's monitor 150 where it can be viewed by the operator.

Figure 7:
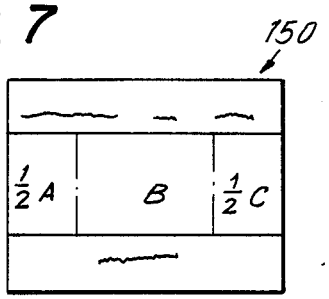
FIG. 7 illustrates a typical display produced by the apparatus of FIG. 6.
Figure 8:
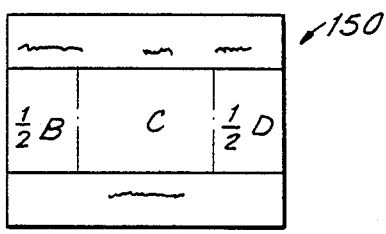
FIG. 8 is similar to FIG. 7.

In the preferred embodiment of the invention, elements 254 and 256 can produce any of several different types of analog video signals for playback viewing on monitor 150. For example, FIG. 7 illustrates what might be thought of as a "normal" display on monitor 150. Assuming that the train being viewed was traveling from right to left relative to monitor 150 (so that images A-C were taken in that order), monitor 150 displays a composite image comprising the trailing one-half of image A on the left, all of image B in the center, and the leading one-half of image C on the right. In the normal sequence of events, the next display would be as shown in FIG. 8 (i.e., the trailing half of image B on the left, image C in the center, and the leading half of the next image D on the right).

Because of the reduced size of images A-C on display 150 in FIG. 7, the upper and lower portions of the screen are not needed for pictorial information. These portions of the screen can therefore be used for textual information such as (in the upper portion) a train identification number, the date and time of passage of the train, the speed at which the train was traveling, the wheel count, etc., and (in the lower portion) the weight of the car visible in central image B (if the system is augmented with conventional trackside car-weighing apparatus (not shown)). The particular textual information displayed and the locations of that information on the screen is entirely arbitrary and can be altered in any desired way. For example, the date, time, and wheel count information can be either general (for the train as a whole), or particular to one of the images on the display (e.g., central image B), or both the general and particular information can be displayed.

Figure 9:
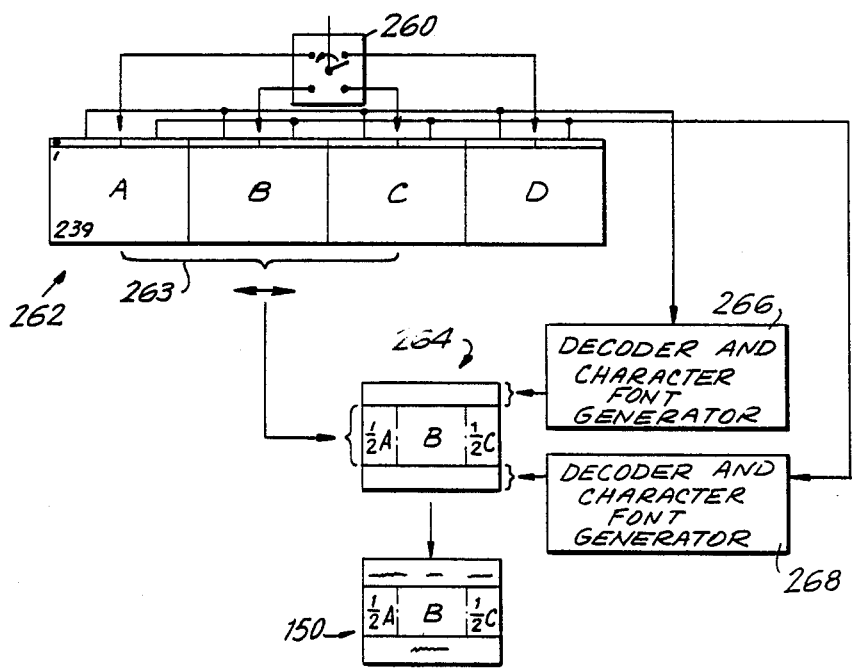
FIG. 9 shows portions of FIG. 6 in more schematic detail.

To produce the above-mentioned textual information, the data to be displayed is stored in disc memory 52 in place of the first line of video signal data. This is illustrated by FIG. 9 (which represents a wrap-around buffer 262 similar to buffer 140 in FIG. 2 but without the bit plane structure and with four image slots A-D instead of only two such slots). Successive images retrieved from disc memory 52 are stored in buffer segments A-D (as suggested by rotary-type switch representation 260). The first line (line "0") for each image contains the textual information to be displayed in the upper and lower portions of screen 150 as described above. This information is encoded so as to replace the first line of pictorial data and so as not to produce any visible information in the pictorial portion of the final display. The left half of this first line contains the textual information destined for the upper portion of the final display, while the right half contains the textual information destined for the lower half of the final display. This textual information data is substituted for the first line of pictorial information prior to storage of the data in disc memory 52.

To form the final display, the appropriate parts of the pictorial data stored in buffer 262 are transferred to the vertically central portion of composite image buffer 264 (as represented by horizontally movable bracket 263). The textual information data from the left half of the first line of the central image (image B in the example shown in FIG. 9) is applied to decoder and character font generator 266 which decodes that data and converts it to the data (in the upper portion of composite image buffer 264) required to produce a video image of the desired text. Decoder and character font generator 268 performs the same function with respect to the textual information from the right half of the first line of the central image. The final image data thus assembled in composite image buffer 264 is converted to an analog signal as described above and applied to display 150.

Composite displays of the type shown in FIG. 7 provide the operator with a great deal of useful information about the original scene. For example, if any car identifying information is split between adjacent images, the split information is automatically reconstructed in the composite image. Similarly, as the progression from FIG. 7 to FIG. 8 illustrates, successive composite images substantially overlap one another, thereby assuring the operator that he or she has not missed any part of the original scene and giving the operator the sense of watching a train progressing across the display screen. However, if the pictorial information in the composite image is too small, the operator can use his or her keyboard 112 to request a full screen view of one image as shown in FIG. 10. This suppresses the adjacent half images, as well as the textual information. Another display option available to the operator is so-called "reverse video" of either displays of the type shown in FIG. 7 or displays of the type shown in FIG. 10.

C. Third Illustrative Embodiment

FIG. 11 shows a third illustrative embodiment which is similar to the first embodiment in that the trackside equipment 310 is typically located a long way from the operator/observer's equipment and may be connected to the operator/observer's equipment only by a relatively low-cost communications link such as a voice-grade telephone line 80. The embodiment of FIG. 11 is different from the first embodiment, however, in the respect that a different scheme is used for transmitting the video information from the trackside equipment to the operator/observer's equipment.

The trackside equipment 310 in FIG. 11 is very similar to a pair of elements 210 and 250 in FIG. 6, and the same reference numbers are used in these two FIGS. for the same or similar elements. The only major differences relate to the fact that the digitized video information stored in disc memory 52 is not converted back to analog form in the trackside equipment, but rather is transmitted in digital form via modem 60 (similar to modem 60 in FIG. 1) to the observer's location as will now be explained in more detail.

In the embodiment shown in FIGS. 1 and 2 (unless that apparatus is being operated after idle mode transmission of the video data), although transmission of the first few bit-planes is relatively fast, the operator must still wait at least some time for transmission of sufficient bit-plane data for each requested image. Because operator time is expensive, and efficient utilization of that time is typically a very high priority, use of idle mode operation to transmit all the data for a train to the operator's location before the operator begins to look at the images for that train means that the operator can then view those images with no time wasted while the system transmits data. However, the amount of time the system of FIGS. 1 and 2 must operate in idle mode to transmit all the video data for a train may be unacceptably long.

The system of FIG. 11 solves the foregoing problem by transmitting a useful portion of the data for each image from disc memory 52 via computer 256, modem 60, transmission line 80, modem 122 (similar to modem 122 in FIG. 2), and computer 356 (similar to computer 256), to disc memory 160 (similar to disc memory 160 in FIG. 2). For example, the most significant three or four bit-planes for each image may be transmitted in this way in a manner similar to idle mode transmission in FIGS. 1 and 2 but in much less time than would be required to transmit all eight bit-planes for each image. The most significant three or four bit-planes provide sufficient information to identify a very high percentage of all freight cars.

Once the initial partial image data transfer from disc memory 52 to disc memory 160 has taken place, the operator can use playback apparatus 370a (similar to playback apparatus 270 in FIG. 6 but with the addition of data monitor 124 similar to display 124 in FIG. 2) to cause that partial image data to be displayed on monitor 150 as described above in connection with FIGS. 1 and 2 or FIG. 6. In particular, assuming that there are several trackside units 310 each communicating via modem with a respective one of several control center recorders 350a, 350b, etc., the operator first uses playback switcher control 372 (similar to keypad 272 in FIG. 6) to select which of recorders 350 will be connected to playback apparatus 370a via call-up switcher 376. (Recorders 350 are interconnected with one another via a conventional local area network ("LAN") so that only recorder 350a needs to include a data display controller 352 for allowing data monitor 124 to display the directories menu of all of the computers in the LAN.) Then within the selected recorder 350, elements 160, 354, and 356 cooperate (in the same way that respectively similar elements 52, 254, and 256 in FIG. 6 cooperate during playback) to retrieve from disc memory 160 the data for selected images and to convert that data to an analog video signal for display on playback monitor 150. If desired, a second playback station 370b (similar to playback apparatus 370a but possibly without another data monitor 124) can be included in the network to allow two operators to simultaneously view the images for two different trains.

If for any image the above-described partial image data is not sufficient for the operator's needs, he or she can request transfer of all or part of the remaining data for that image from memory 52 to memory 160. In this way the initially inadequate image will be enhanced on monitor 150. Because the partial image data will be sufficient for most images, the operator can process most images with no operator time lost waiting for data transmission. Only for a small percentage of images will the operator need and therefore have to wait for transmission of additional information.

Different coding techniques may be preferable for the initial partial and supplementary later data transmissions. For example, it may be preferable to send the initial partial transmission using the above-described bit plane technique, and if additional data is required for an image, to then transmit all the data for that image using some other efficient data compression technique such as the well-known block truncation coding method.

Figure 12:
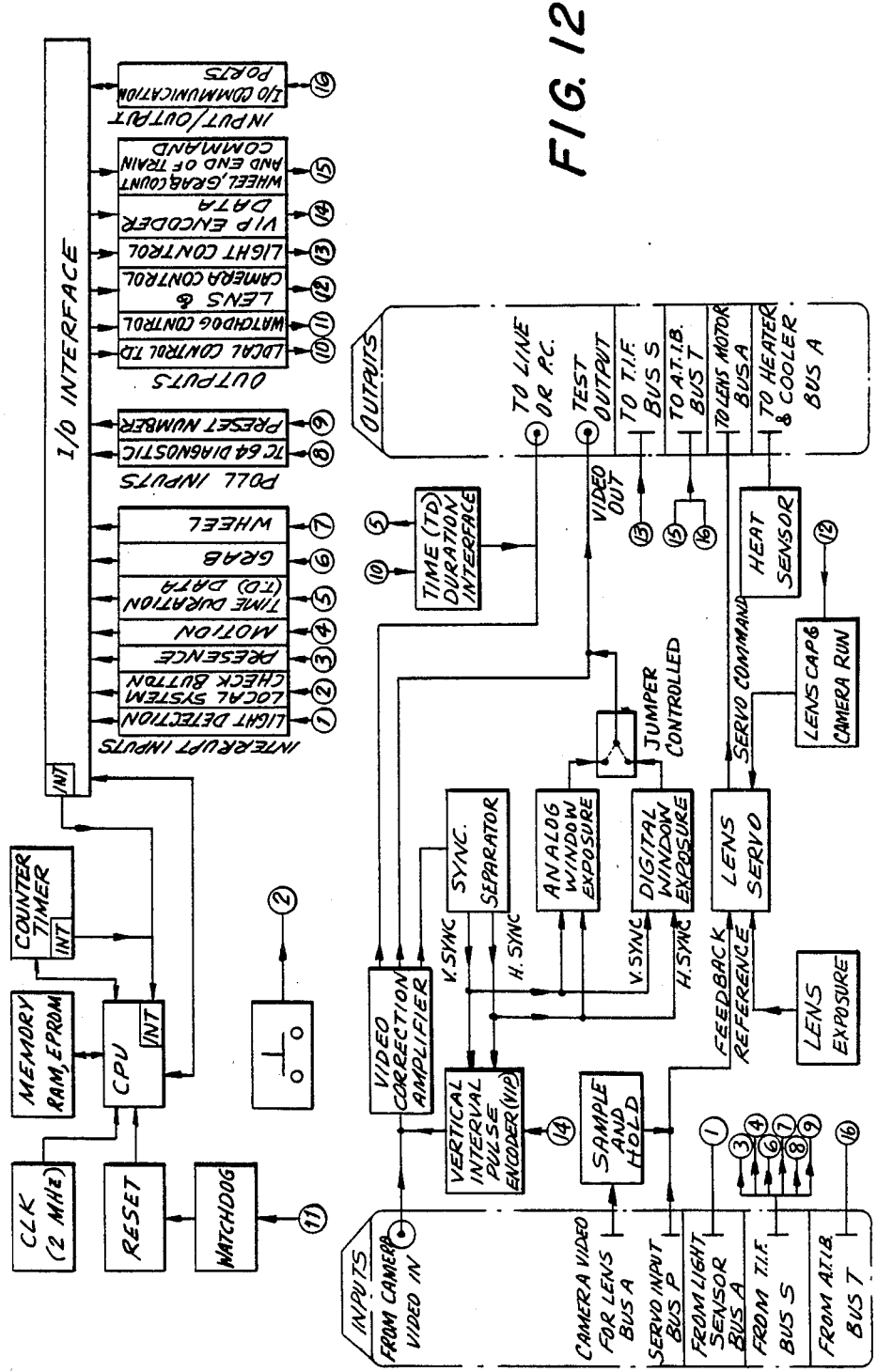
FIG. 12 is a schematic block diagram of an illustrative embodiment of a portion of the apparatus shown in FIGS. 6 and 11.

D. Additional Information Regarding Components of Second and Third Illustrative Embodiments FIG. 12 shows a typical trackside masterboard ("TSM") 230 in FIG. 6 or FIG. 11. Because much of what is shown in FIG. 12 will be self-explanatory to those of ordinary skill in the art in view of the preceding discussion, it will not be necessary to describe every element and feature shown in FIG. 12. Only those elements and features that might not be fully self-explanatory will be mentioned below. (Note that similarly numbered circles in FIG. 12 are connected to one another.)

In the central processing unit ("CPU") and elsewhere, INT refers to interrupts. The watchdog is a device which resets the CPU if it does not receive a control signal 11 within a predetermined periodic time interval. Thus any malfunction of the apparatus which causes it to stall can be obviated.

The several lines of the so-called vertical interval of the video signal are used to send signals like the wheel, grab, and end of train data signals from the trackside equipment to the yard office equipment. Each of these vertical interval lines is associated with a respective one of these data signals, and the data is sent by making the associated vertical interval line "white." This is done by the vertical interval pulse encoder VIP in response to data applied to circle 14.

Data is sent back from the yard office equipment to the trackside equipment by superimposing pulses of various time duration (e.g., 1, 2, or 3 seconds) on the video signal line. An example of this data would be a request to view live video (assuming that a train was not present). This data is extracted from the video signal by the time duration interface which applies that data signal to circle 5. To facilitate testing of the system, simulated time duration data signals can be applied to the video signal from circle 10.

The camera video for lens signal on bus A is the video signal before the normal high voltage clipping which is performed to produce the final video signal. The sample and hold device samples and averages this signal at several pixels in a window in the field of view in order to properly control the exposure of camera 40 in FIG. 6. The servo input signal on bus P is the feedback signal from the camera exposure control. The camera lens is capped and the camera is in standby mode unless a train is being photographed or live video has been requested, in which case the camera lens is uncapped and the camera is switched to the run mode.

Figure 17:
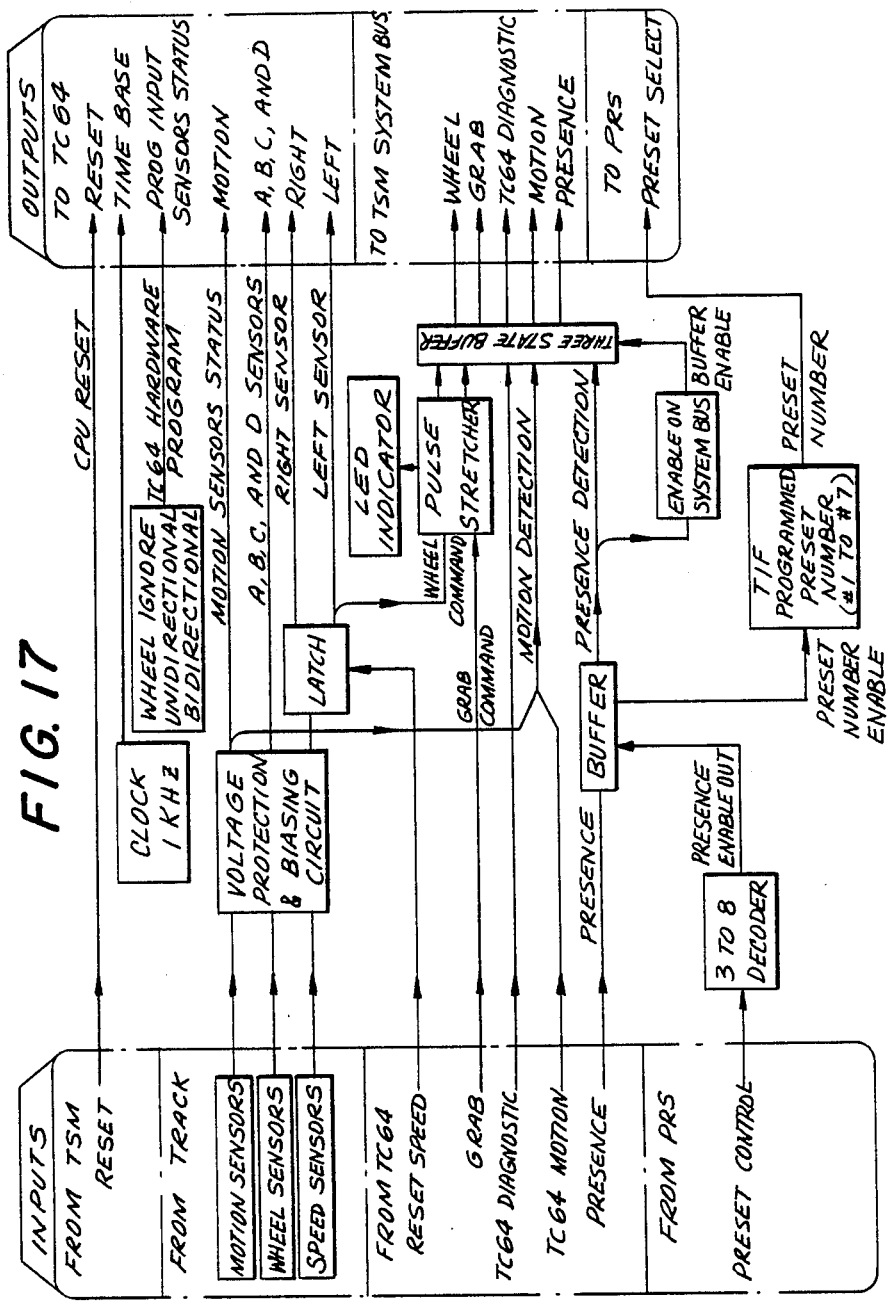
FIG. 17 is a schematic block diagram of an illustrative embodiment of another portion of the apparatus shown in FIGS. 6 and 11.

Considering now the outputs, the video signal applied to line or PC is the video signal transmitted to the associated yard office equipment 250 in FIG. 6 ("line") or to the associated digital imager 254 in FIG. 11 ("PC"). The test output allows a video monitor to be connected to the trackside equipment as part of a test of that equipment. Either the analog window exposure or the digital window exposure can be selected to highlight either the analog or digital window in the test video output signal to facilitate proper selection of the window to be used for exposure control as described above. TIF stands for trackside interface which is shown in FIG. 17, while ATIB stands for AT interface board which is shown FIG. 19. The lens motor is the camera iris control. When the camera is in standby mode, the lens is "capped" by completely closing the iris. The heater and cooler is unit 226 in FIG. 6.

In the interrupts, etc., presence refers to the fact that a train is present between track sensors 20a and 20b. Motion refers to the fact that the detected train is moving. TC 64 refers to the circuitry which directly serves sensors 20 and 22 in FIG. 6 and which produces such signals as the presence, motion, speed, and grab signals. The preset number is used in systems in which one camera 40 can be used to view trains on several adjacent parallel tracks. In that case it is necessary to have a camera with zoom, focus, and vertical tilt controls. These controls are encoded by the preset number. Preset is explained in more detail in connection with FIG. 18. The I/O communications ports are used for bidirectional data communication between the trackside masterboard and an associated computer 256 when the system is configured as shown in FIG. 11. This communication channel is used for high level problem detection in the trackside equipment. The pushbutton connected to circle 2 is a manual switch for initiating a self-test of the trackside equipment.

Figure 13:
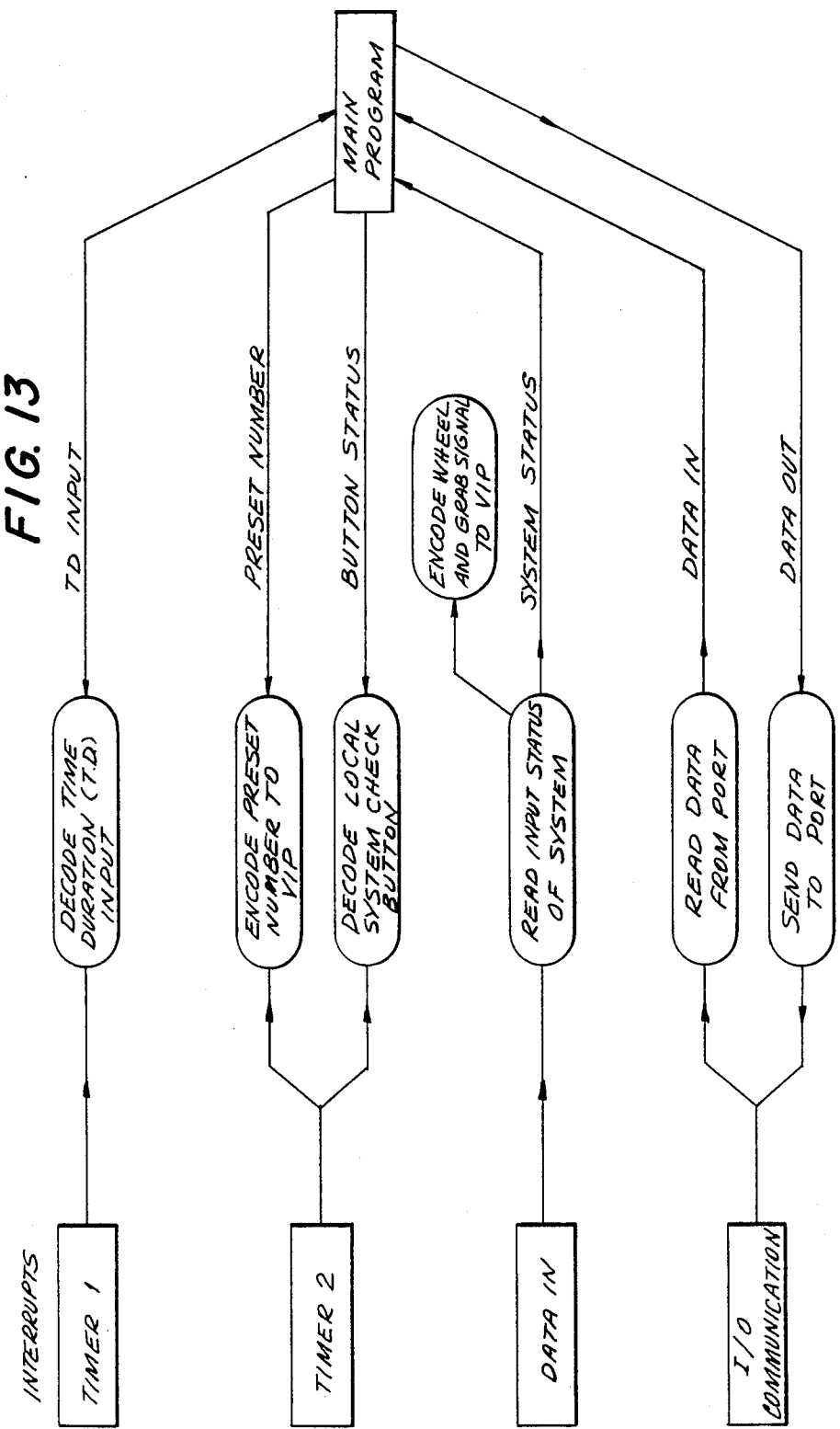
FIGS. 13-16 are flow charts of illustrative software suitable for execution on the central processing unit ("CPU") in FIG. 12.
Figure 14:
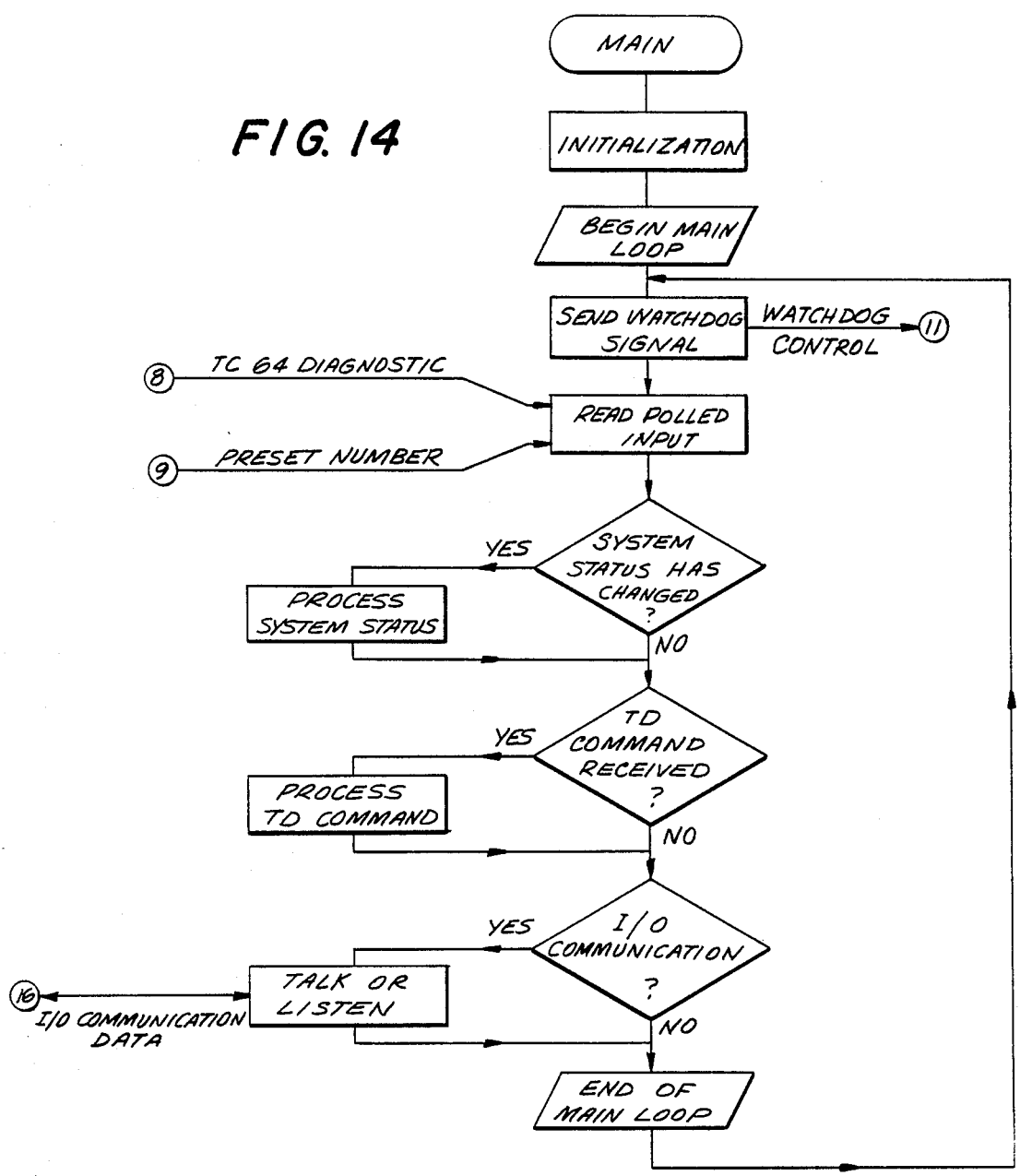
Figure 15:
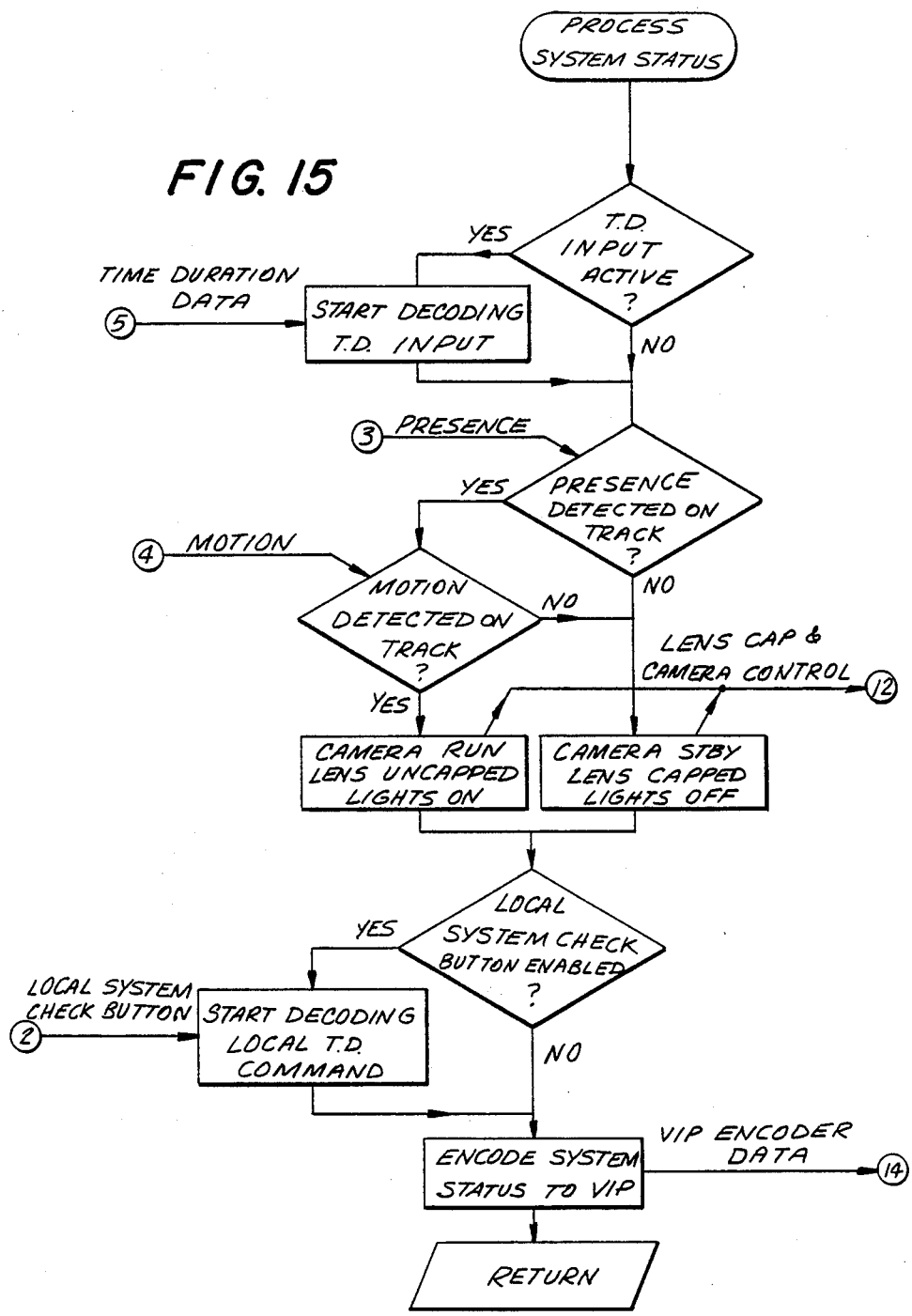
Figure 16:
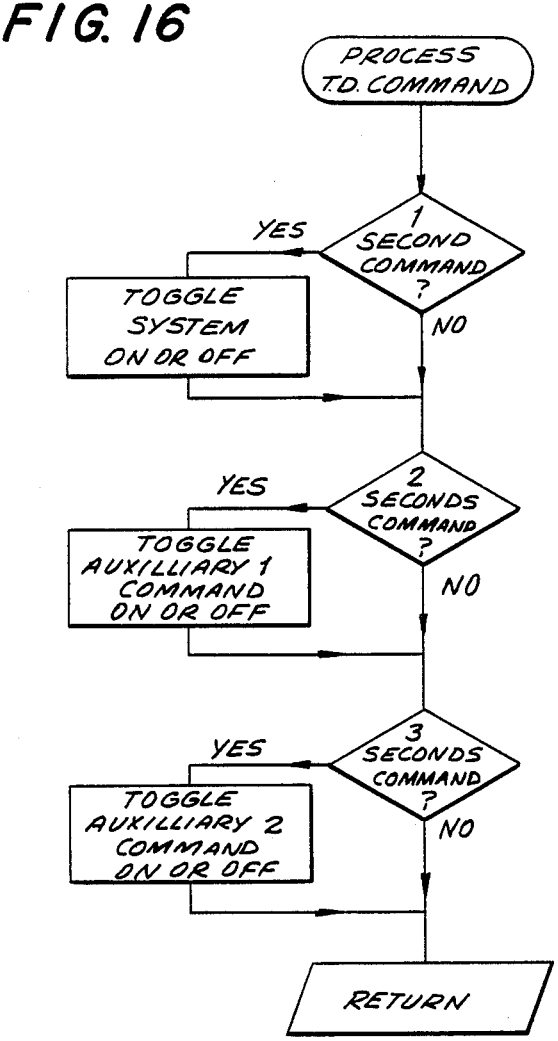

FIGS. 13-16 are flow charts of illustrative software executed by the CPU in FIG. 12. FIG. 13 shows the interrupts portions of this software. FIG. 14 shows the main program. And FIGS. 15 and 16 show two subroutines called by the main program. The circled numbers in FIGS. 14 and 15 correspond to the similarly numbered circles in FIG. 12. As in the case of the hardware block diagram of FIG. 12, most of what is shown in FIGS. 13-16 is self-explanatory. Only those aspects of these FIGS. that may not be fully self-explanatory will be mentioned below.

Timer 1 is the interrupt which is used to control the decoding of the time duration data mentioned above in connection with FIG. 12. Timer 2 is the interrupt which is used to control encoding the preset number (including the current zoom, focus, and tilt status of the associated camera 40) for transmission back to the yard office equipment via the vertical interval signalling scheme mentioned above in connection with FIG. 12. This interrupt also decodes operation of the local system check button connected to circle 2 in FIG. 12. The data in interrupt reads data from the above-mentioned TC 64. It also controls putting some of this data on the video signal using the above-mentioned VIP coding scheme. The I/O communication interrupt controls transmitting data between the TSM CPU and the associated computer 256 when the system is configured as shown in FIG. 11.

Turning now to FIG. 14, system status refers to such variables as the presence, motion, and end-of-train variables. TD command refers to the above-mentioned time duration data. The process system status subroutine is shown in detail in FIG. 15, while the process TD command subroutine is shown in detail in FIG. 16. In FIG. 16 the 1 second command is a time duration pulse lasting one second and used to allow the operator at the yard office to turn the camera on in order to view live video if no train is being recorded. The 2 seconds command and the 3 seconds command are time duration commands lasting two and three seconds respectively and usable for sending any predetermined messages from the yard office equipment to the trackside equipment.

FIG. 17 is a block diagram of the trackside interface board ("TIF") 220 in FIG. 6 (or FIG. 11), exclusive of the component known as the TC64 (because that component may be similar to the corresponding portion of the apparatus shown in Raymond et al. U.S. Pat. 4,264,927). Again, only the portions of FIG. 17 that may not be fully self-explanatory are mentioned below.

The reset referred to originates with a push button (not shown) in the TSM (FIG. 12) which can be used to simultaneously reset all of the trackside equipment. The wheel ignore unidirectional bidirectional device is a switching device which allows the trackside equipment to be set up to respond only to trains moving in one direction ("unidirectional") or to trains moving in both directions ("bidirectional"). The motion sensors referred to are all of sensors 20 and 22 in FIG. 6. (Each of sensors 20 and 22 is actually two sensors spaced close to one another along the length of the track.) The wheel sensors referred to are one of the two sensors 22 (depending on which way the train is going). The speed sensors are the two sensors 22 (spaced a known distance apart to make train speed determination possible). The voltage protection and biasing circuit is conventional surge protection and signal level control. The A and B sensors are respectively the two sensors 20b, while the C and D sensors are the two sensors 20a. The left and right sensor status signals indicate which of the two sensors 22 is currently being used as the wheel sensor. The reset speed sensors data signal indicates that a new wheel has been detected by one of sensors 22 and that a new speed value is being calculated. The three state buffer is a tristatable buffer which normally passes data to the TSM system bus, but which can be disabled ("tristated") to effectively disconnect the TSM system bus from this particular trackside interface board. If the trackside equipment is designed to allow camera 40 to view trains on any of several adjacent parallel tracks, then there is a TIF and associated TC64 for each track. Only one TIF-TC64 circuit can be enabled at any one time, and only the three state buffer for the enabled TIF-TC64 circuit will accordingly be enabled. The TIF programmed preset number is the unique number of this particular TIF. PRS refers to the preset board shown in FIG. 18.

Figure 18:
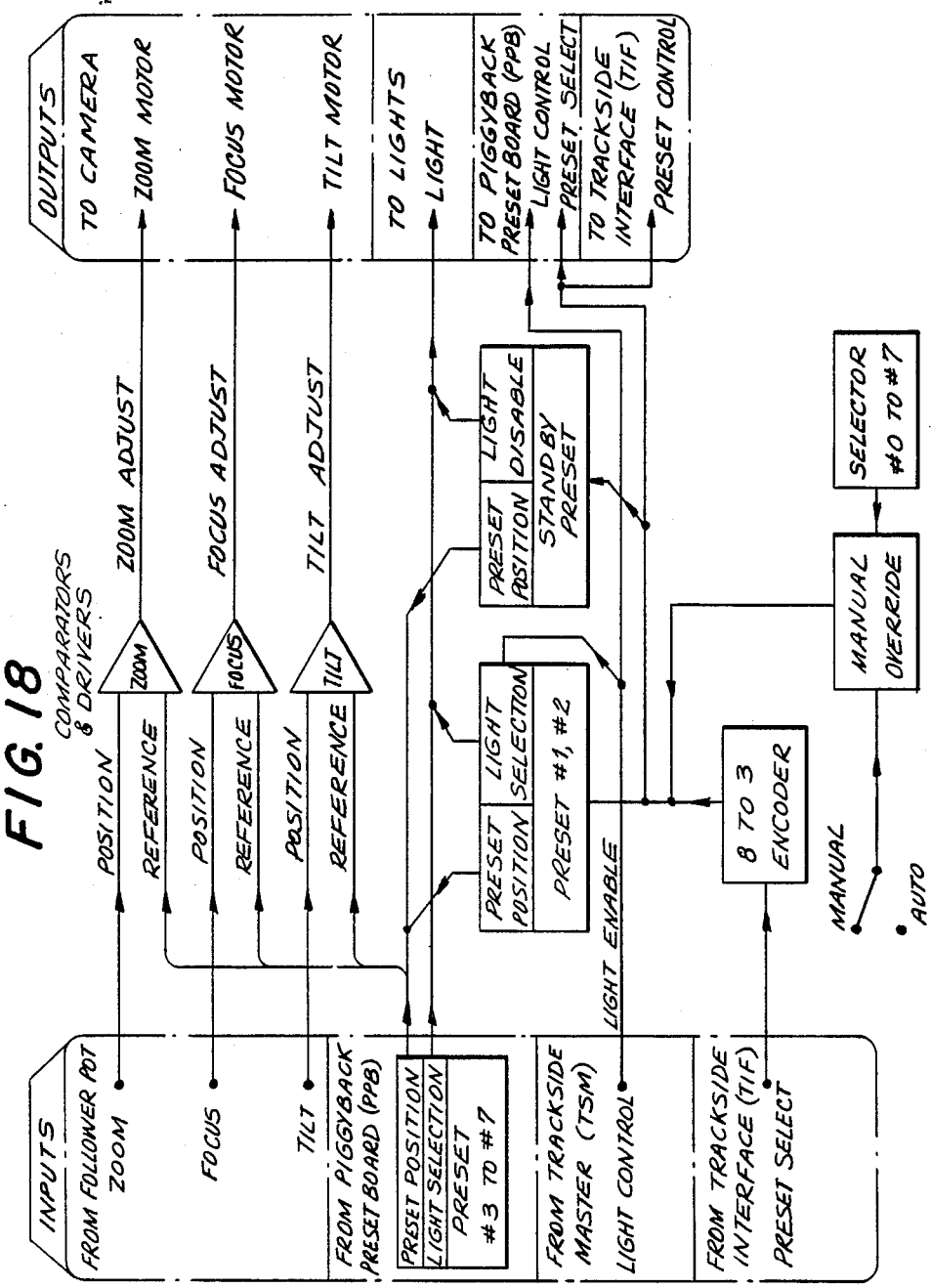
FIG. 18 is a schematic block diagram of an illustrative embodiment of a circuit which can optionally be added to any of the system embodiments shown and described herein.

Turning now to the preset board ("PRS") shown in FIG. 18, this board is part of the trackside equipment 210 (FIG. 6) or 310 (FIG. 11) only if the trackside equipment is designed to be capable of viewing trains on two or more adjacent and parallel tracks. The system is capable of responding to a standby preset ("preset #0" in which the lights are typically off and camera zoom, focus, and tilt positions are established that will expedite system response when a nonzero preset command is to be executed) and up to seven operating presets ("preset #1" through "preset #7," each of which is typically associated with a respective one of up to seven parallel tracks, each requiring a predetermined zoom, focus, and tilt position and a predetermined light level). (Tilt is just the vertical angle of inclination of the camera.) The preset board shown in FIG. 18 can only handle presets #0, #1, and #2. If more presets are required, a piggyback preset board ("PPB") (not shown but logically similar to parts of FIG. 19) may be added to take care of presets #3 through #7.

Assuming that the trackside equipment includes the PRS board shown in FIG. 18, when the system is on standby, the standby preset disables the lights and sends standby reference values to each of the zoom, focus, and tilt comparators and drivers. As long as any one of these reference values differs from the associated zoom, focus, or tilt position follower potentiometer output signal, an adjust signal is applied to the corresponding zoom, focus, or tilt motor to appropriately reposition the camera.

As soon as a train is detected on any of the tracks served by the trackside equipment, the associated TIF 220 applies the preset select signal for that track to the PRS. The 8 to 3 decoder decodes that preset select signal, and the preset #1, #2 device applies the appropriate light selection signals to the lights and applies the appropriate zoom, focus, and tilt reference signals to the comparators and drivers. This causes the zoom, focus, and tilt motors to reposition the camera as required to view the train on the track on which the train presence was detected. The preset control signal is also applied to the TIF to allow the buffer in that device to pass the presence to the three state buffer also in the TIF. The control or light enable signal (which actually turns on the selected lights) is applied to the PRS from the trackside master 230. This signal and the preset select signal are applied to the piggyback preset board if one is provided as discussed above, and that board returns appropriate preset position and light selection signals if one of presets #3 through #7 is selected.

The PRS also has a manual operation mode used for such purposes as testing the associated camera controls and lights. This mode can be selected by throwing the depicted switch to the manual position and then using selector #0 to #7 to select the preset to be tested.

If the system is a remote system of the type shown in FIG. 11, then trackside equipment 310 includes computer 256 (e.g., an IBM AT model personal computer or the equivalent). In that case, interface board 252 (also known as the AT interface board or ATIB) is part of trackside equipment 310 as shown in FIG. 11. On the other hand, if the system is a local or direct system as shown in FIG. 6, the ATIB is part of yard office master ("YOM") board 252, which is shown in FIG. 21 and described in more detail below.

Figure 19:
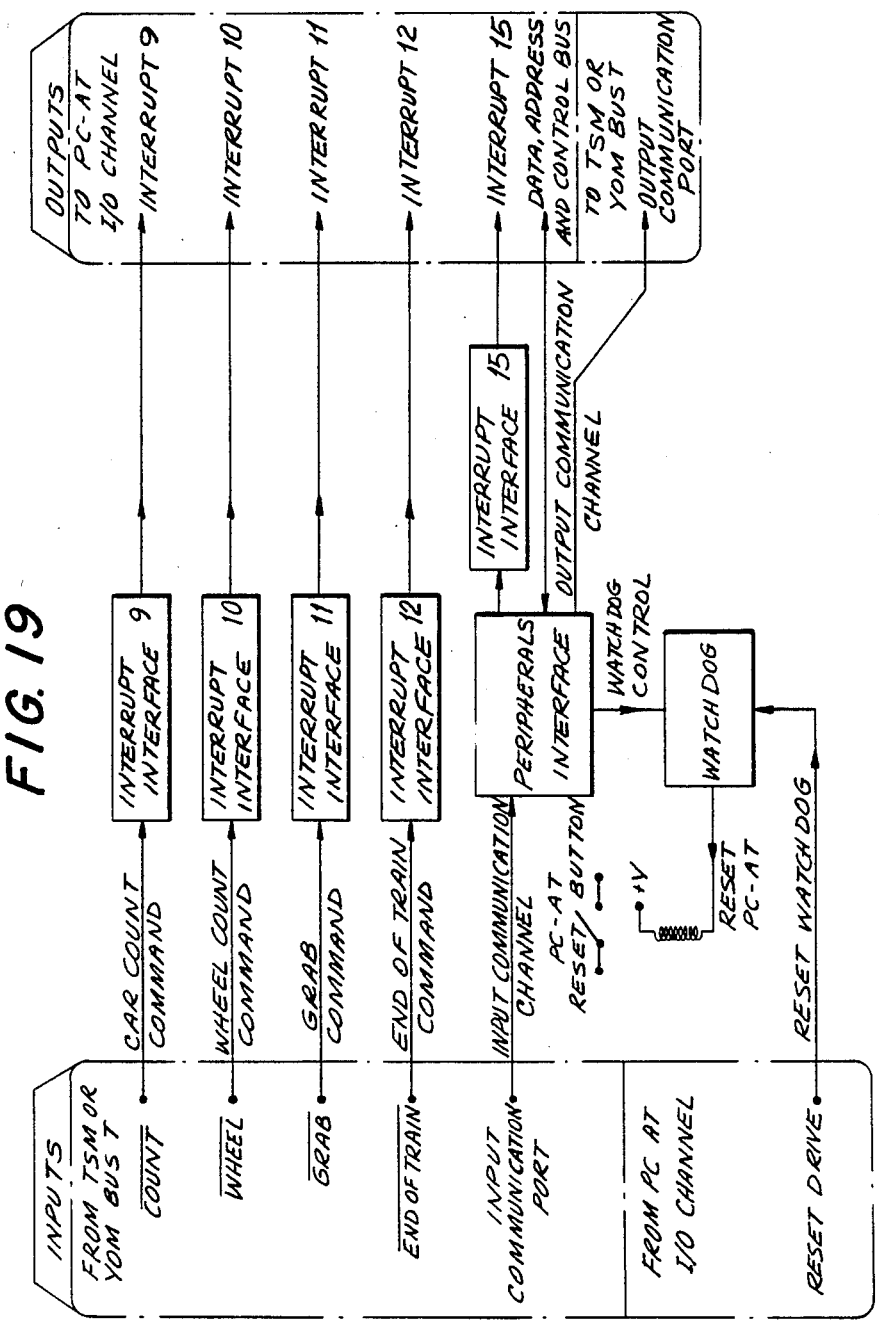
FIG. 19 is a schematic block diagram of an illustrative embodiment of yet another portion of the apparatus shown in FIGS. 6 and 11.

FIG. 19 shows the ATIB in more detail. Each of the wheel, grab, and end of train signals (which come either from the trackside master board 230 in FIG. 11 or from the yard office master board 252 in FIG. 6) applies an interrupt to the PC-AT 256 I/O channel to appropriately interrupt the software running on the computer for processing the signal causing the interrupt. (The count signal is similar to the other signals just mentioned but is used to enable the system to count the cars in the passing train.) The input communication port signal is the signal used for high-level diagnostic communication between the computer 256 and the associated trackside master board 230 (if any as in FIG. 11) as described above or the associated yard office master board 252 (if any as in FIG. 6) as described below. The peripherals interface device is a conventional general-purpose device (known to those skilled in the art as a PPI) in computer 256 for serial/parallel communication. The watchdog circuitry is similar to the watchdog described above in connection with the trackside master board (FIG. 12). The other reset circuitry is self-explanatory.

Figure 20:
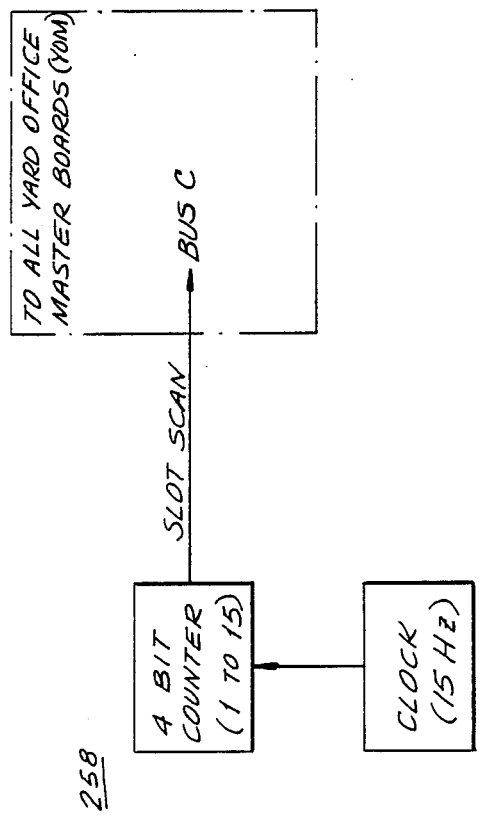
FIG. 20 is a schematic block diagram of an illustrative embodiment of another portion of the apparatus shown in FIG. 6.

Turning now to the apparatus which is typically not located at the trackside, FIG. 20 shows a portion of system common board 258 in FIG. 6. In particular, the output signal of a 15 Hz clock is applied to a four-bit counter to produce a slot scan output signal on bus C. This slot scan signal is used to select each of as many as 15 yard office master boards 252 in FIG. 6 one after another in a repeating cycle.

FIG. 21 shows a typical yard office master board ("YOM") 252 in FIG. 6 in more detail. (Each yard office master board 252 also includes an AT interface board shown in FIG. 19 and described above.) As in the case of the other diagrams described in this section of the specification, it will not be necessary to describe every element and feature of FIG. 21 because many of those elements and features will be self-explanatory to those of ordinary skill in the art. Only those elements and features that might not be fully self-explanatory will be mentioned below. (Note that similarly numbered circles in FIG. 21 are connected to one another.)

In the central processing unit ("CPU"), INT refers to interrupts and NMI refers to nonmaskable interrupts (i.e., interrupts which cannot be delayed). The watchdog is similar to the abovedescribed watchdog devices (i.e., a device which resets the CPU if it does not receive a control signal 11 within a predetermined periodic time interval). Thus any malfunction of the apparatus which causes it to stall can be circumvented.

The video in signal is from the associated trackside master board 230 in FIG. 6. The slot scan signal from bus C, FIG. 20, is applied to circle 1 in FIG. 21. The time and date signal (also from system common board 258 as mentioned in an earlier section of this specification) is applied to circle 3. The input buttons are the switches on keypads 272 in FIG. 6 (also shown in FIG. 26 as the video switcher key pad and the command keypad) which allow selection of which YOM 252 will supply video information to which operator station 270, etc. (Bus PA refers collectively to lines 280a and A in FIG. 6, while bus PB refers collectively to lines 280b and B in FIG. 6.) The command keys are duplicated at the YOM to facilitate testing of the apparatus. These duplicated command keys (not shown) are referred to as "local" and are connected to local bus R. Bus P are hardwired inputs identifying such fixed variables as the camera and the slot numbers associated with this particular YOM 252. The PC video input is the analog video output of the associated digital imager 254 in FIG. 6. The keyboard inputs are the inputs from the two keyboards 112 in FIG. 6 (supplied via the playback keypad interface boards ("KIB") 276 shown in more detail in FIG. 26). If, as has been mentioned as a possibility, the associated trackside equipment includes a conventional weighing scale, the ASCII output signal of that scale is applied to circle 2.

The time duration data at circle 16 has been mentioned above in connection with FIG. 12. It is a means by which control signals such as a manual override signal can be sent to the trackside equipment via the video signal connection. The wheel, grab, and end of train signals are extracted from the vertical interval of the video signal and applied to circle 6. The signal applied to circle 10 is data (e.g., the weighing scale data) which is to be added to the video signal as a visible overlay in the final image. The TV display controller adds this image information to the video signal. The display erase trigger causes these visible overlays to be erased after a predetermined time interval.

The video output to the computer is connected to the analog video input of the associated digital imager 254 (FIG. 6). The local command keys mentioned above are backlit by local status lamps (e.g., to indicate which keys have been selected) connected to bus R. The video switcher key pad keys and command keypad keys (FIG. 26) are also backlit by so-called remote status lamps. The ATIB is the AT interface board shown in FIG. 19 and described above.

The sound signal control applied to circle 19 is a signal generated at the end of a train in a currently nonpreferred video tape embodiment to cause an audio output for prompting the operator of the system to change the video tape cassette which has been ejected at the end of the train. The I/O communications ports signal (circle 20) is similar to the similarly named signal in FIG. 12 and is for communication between the YOM 252 and the associated computer 256 (FIG. 6) for such purposes as allowing the YOM to advise the computer of trouble it is experiencing (e.g., that there is no usable video signal).

Figure 23:
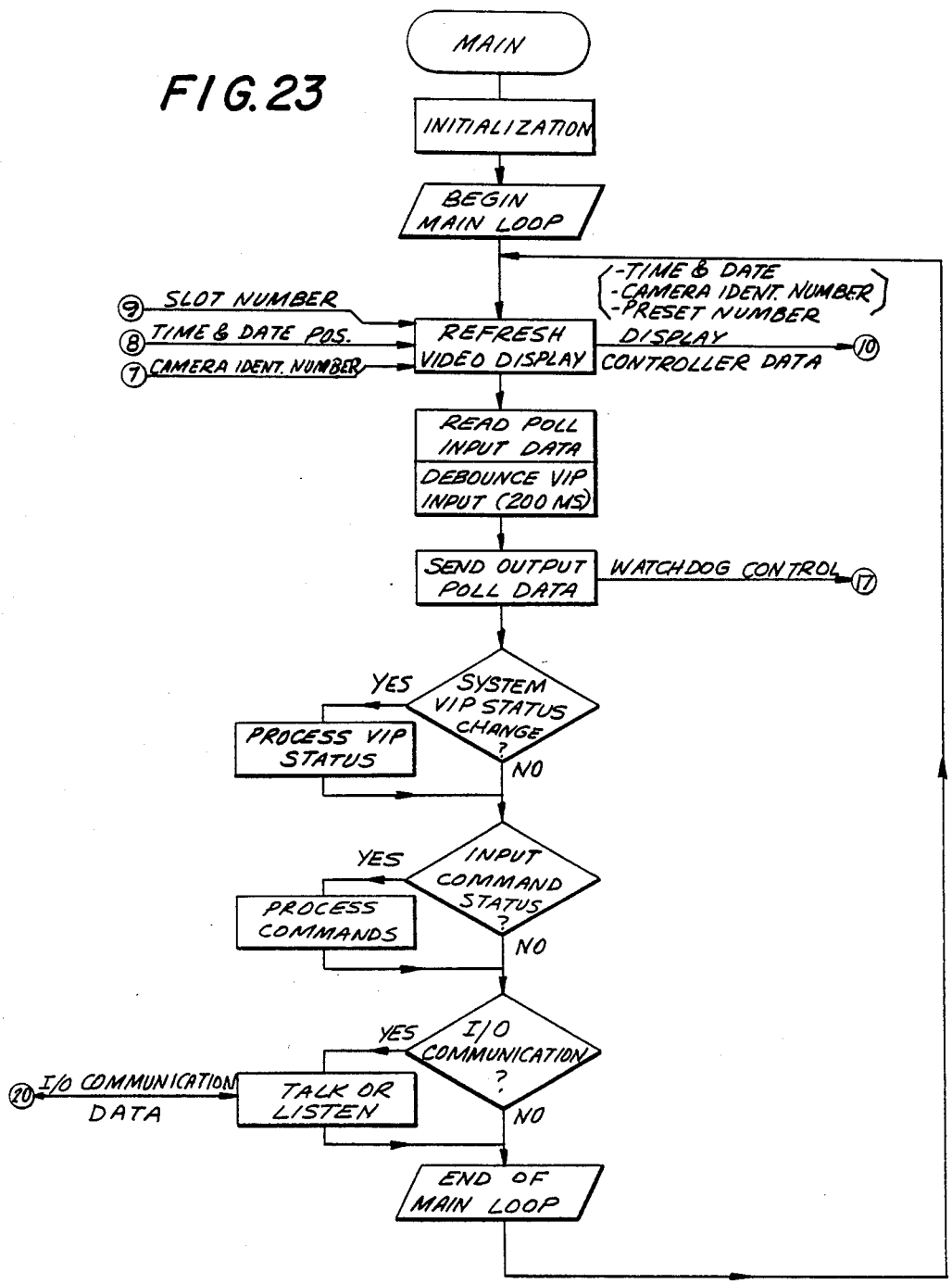
Figure 24:
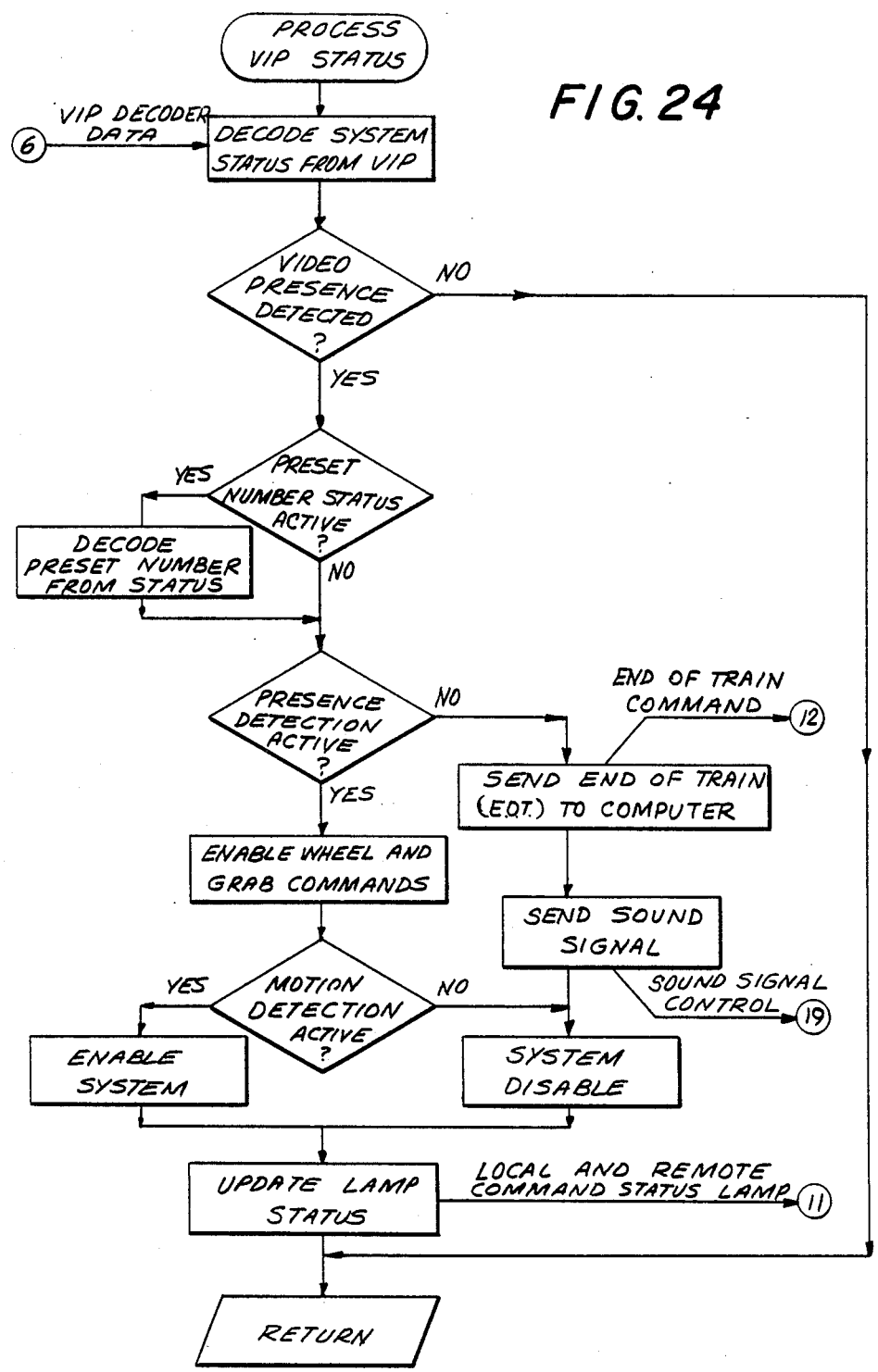
Figure 25:
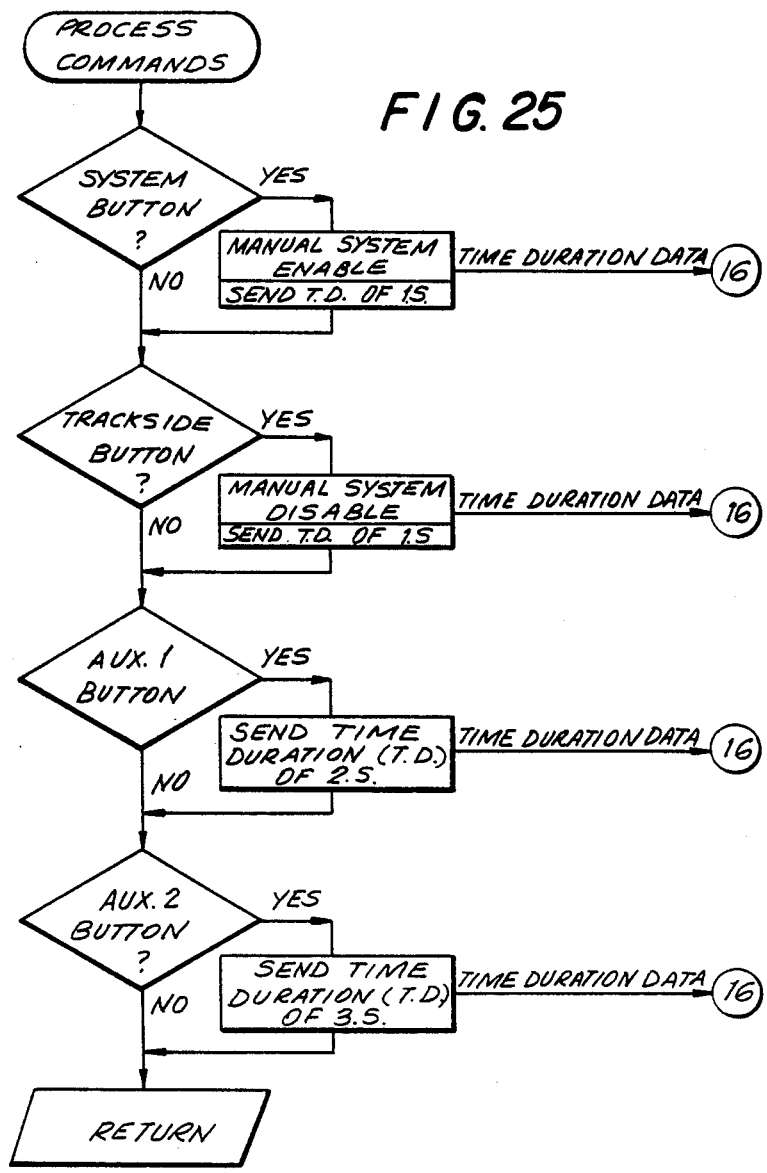

FIG. 22 is a flow chart of the interrupts portions of the software executed by the CPU in FIG. 21. FIG. 23 is a flow chart of the main program referred to in FIG. 22 (i.e., the main program running on the CPU in FIG. 21). And FIGS. 24 and 25 are flow charts of two principal subroutines included in the main program in FIG. 23. The numbered circles in FIGS. 22-25 correspond to the similarly numbered circles in FIG. 21. As in the case of other flow charts described above, these flow charts are largely self-explanatory, so that it will not be necessary to describe every feature of them. Only such features as may not be fully self-explanatory will be mentioned below.

The timer trigger is the interrupt which periodically causes the visible overlays (e.g., the weighing scale data) to be erased from the video images. Timer 1 is the interrupt which periodically determines whether or not the operator has requested to see the "live" video signal from the associated camera 40 in FIG. 6. If such a request has been made, the appropriate camera control signals are encoded as time duration data applied to circle 16 (but only if there is no train currently being viewed by that camera). Timer 2 is the interrupt which periodically monitors the "preset" status of the associated camera 40 in FIG. 6. The preset feature is described in detail above in connection with FIG. 18. The slot-scan interrupt is explained above in connection with FIG. 21. The reference to blinking of lamps relates to the fact that the backlighting lamps for the command keypad keys (FIG. 26) are made to blink in predetermined patterns to indicate that the presence of a train or the end of a train has been detected. The ASCII in interrupt periodically tests for the availability of a new ASCII data character (e.g., from the weighing scale input described above). The time in interrupt updates the time and date data from system common board 258 in FIG. 6. The local switches interrupt periodically reads the command keypad switches that are duplicated at the YOM as described above. The playback switches interrupt periodically reads the switches on the associated keypad 272 in FIG. 6. The data in interrupt periodically reads the vertical interval pulse (at circle 6 in FIG. 21). The I/O communications interrupt handles communications between the YOM 252 and the associated computer 256 in FIG. 6.

In FIG. 23 the read poll input data step refers to the main program taking in I/O communication data generated during the I/O communication interrupt. The send output poll data step is similar but for data to be sent out from the main program. The process VIP status subroutine is shown in detail in FIG. 24. Video presence detection refers to the detection of a video signal. Presence detection refers to the detection of a train. The sound signal referred to is the one mentioned above for alerting the operator to change the video tape cassette at the end of a train. The process commands subroutine is shown in detail in FIG. 25. The system, trackside, aux. 1, and aux. 2 buttons are the command keypad keys shown in FIG. 26. "1.S.," "2.S.," and "3.S." refer to time duration signalling pulses of one second, two seconds, and three seconds, respectively.

Figure 26:
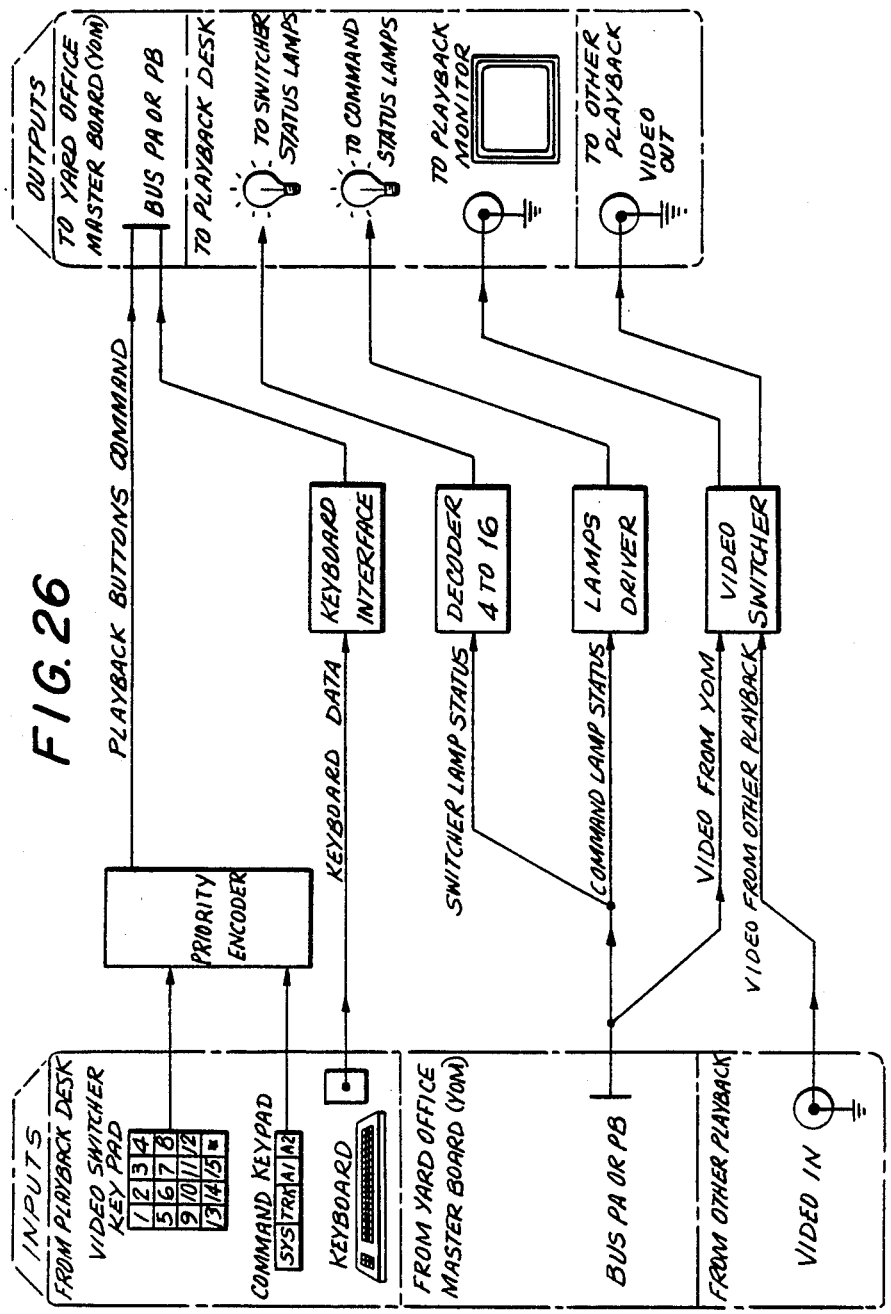
FIG. 26 is a schematic block diagram of an illustrative embodiment of still another portion of the apparatus shown in FIGS. 6 and 11.

FIG. 26 shows the playback keypad interface board ("KIB") 276 in FIG. 6 in more detail. This board may also form part of the combination of elements 372 and 112 in FIG. 11. The video switcher keypad is a 15-button switch for selecting the one of up to 15 slots (yard office units 250 in FIG. 6) that will communicate with the playback unit 270 of which this KIB is a part. The command keypad is a four-button switch which initiates the transmission of time duration signals to the trackside equipment. For example, the SYS (system) button initiates the transmission of the time duration signal that places the system in normal automatic operation. The TRK (trackside) button initiates the transmission of the time duration signal that causes the system to transmit "live" video to the playback station. The A1 (aux. 1) and A2 (aux. 2) buttons are extra buttons available for use by the operator of the system to send other predetermined messages to the trackside equipment. The video switcher keypad and command keypad are collectively shown as keypad 272 in FIG. 6. In the event that several keypad buttons are operated simultaneously, the priority encoder selects which button signal will be transmitted to the associated playback bus PA or PB. The depicted keyboard corresponds to the associated keyboard 112 in FIG. 6.

Each of the buttons in the video switcher keypad is backlit (when selected) by an associated switcher status lamp. The illumination of these lamps is controlled by the output signal of the 4 to 16 decoder. Similarly, each of the command keypad buttons is backlit (when selected) by an associated command status lamp. The illumination of these lamps is controlled by the depicted lamp drivers. FIG. 33 shows the command keypad buttons and associated lamps in more detail, and FIG. 34 similarly shows the video switcher keypad buttons and associated lamps in more detail. The abbreviations used in FIGS. 33 and 34 are interpreted as follows: SYS means system; TS means track-side; A1 and A1 means auxiliary 1 and auxiliary 2, respectively, PRES means presence; L/V means live/playback; and 1-15 respectively denote cameras 1-15. Table 1 below shows how each of the lamps in FIG. 33 is used (the WAIT and PRES lamps are used only in the presently non-preferred video tape embodiment), while Table 2 below shows how each of the lamps in FIG. 34 is used.

TABLE 1

STATUS COMMAND LAMPS

| Name | Status | Description |
|---|---|---|
| System | On | Automatic System On |
| | Off | System Off |
| | Blink 1 Hz | Manual System On |
| Track Side | On | Automatic System On |
| | Off | System Off |
| | Blink 1 Hz | Manual Track-Side System On |
| Auxiliary 1 | On | Automatic Aux. 1 Command On |
| | Off | Aux. 1 Command Off |
| | Blink 1 Hz | Manual Aux. 1 Command On |
| Auxiliary 2 | On | Automatic Aux. 2 Command On |
| | Off | Aux. 2 Command Off |
| | Blink 1 Hz | Manual Aux. 2 Command On |
| Wait | On | Not Ready To Accept A Command |
| | Off | Ready To Accept A Command |
| | Blink 8 Hz | No Video Input Detected |
| Presence | On | Presence On Track |
| | Off | No Presence On Track |
| | Blink 1 Hz | End Of Train |

TABLE 2

STATUS SWITCHER LAMPS

| Name | Status | Description |
|---|---|---|
| 1 | On | Select Video From Camera 1 |
| (Up To 15) | Off | Do Not Select Video From Cam. 1 |
| Live/ | On | Video From Computer |
| Playback | Off | Live Video From Camera |

Continuing now with FIG. 26, the video signal from the YOM 252 in the selected yard office equipment or the video signal from the other playback unit 270 can be applied to the associated playback monitor 150. The video signal applied to that monitor is also applied to a video output port for application to the video in of the other playback. This interconnection of the video signals applied to the two playback units 270 allows the operator of either unit to see what the other operator is seeing if desired.

Figure 27:
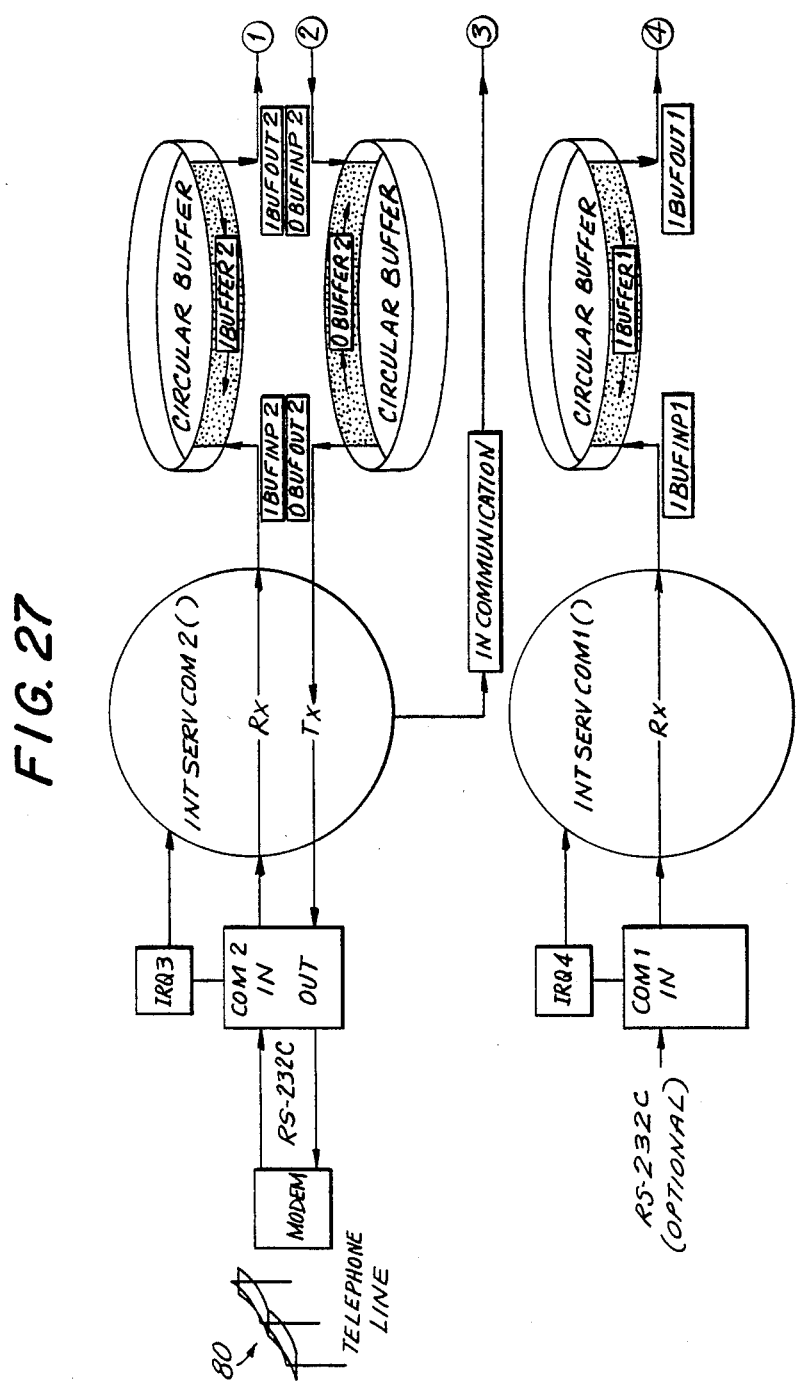
FIG. 27 is a schematic diagram of illustrative software suitable for execution on the computers shown in FIG. 11. A portion of this software is also suitable for execution on the computers shown in FIG. 6.

FIG. 27 is a schematic diagram of the communication servers portions of the software which runs on computers 256 and 356 in FIG. 11. The software depicted in the upper portion of FIG. 27 handles communication via line 80 in FIG. 11. The optional software depicted in the lower portion of FIG. 27 handles communication such as with the weighing scale which may be included in the trackside equipment. This latter portion of the software, if included, runs only on computer 256 in FIG. 11, and it may also run on computer 256 in FIG. 6. The telephone line shown in FIG. 27 corresponds to line 80 in FIG. 11. The modem shown in FIG. 27 is either modem 60 or modem 122 in FIG. 11. The combination of COM 2 and IRQ3 is a conventional communications chip in an IBM AT personal computer or the equivalent. (IRQ3 generates an interrupt whenever the COM channel receives data.) The combination of IRQ4 and COM 1 is similar. The large circle labelled IntServCom2() represents the software that interfaces with the COM 2 port (Rx represents receiving; Tx represents transmitting.) The large circle labelled IntServCom1() is similar but for the COM 1 port. InCommunication is a flag indicating whether or not the associated modem is in communication with a remote modem. Variables like IBufInp2 and IBufOut2 are pointer values for the associated circular buffers (e.g., IBuffer2). The arrows on the circular buffers indicate the direction in which the pointer values move (relative to the "stationary" data in the buffer). Thus, as successive data items are received via the COM 2 port, pointer IBufInp2 moves clockwise. Pointer IBufOut2 also moves clockwise until it reaches IBufInp2, thereby emptying data from IBuffer2 as rapidly as possible. The numbered circles in FIG. 27 correspond respectively to the similarly numbered circles throughout FIGS. 28-32. Indeed, the same rule applies to all of the numbered circles used throughout FIGS. 27-32.

Figure 28:
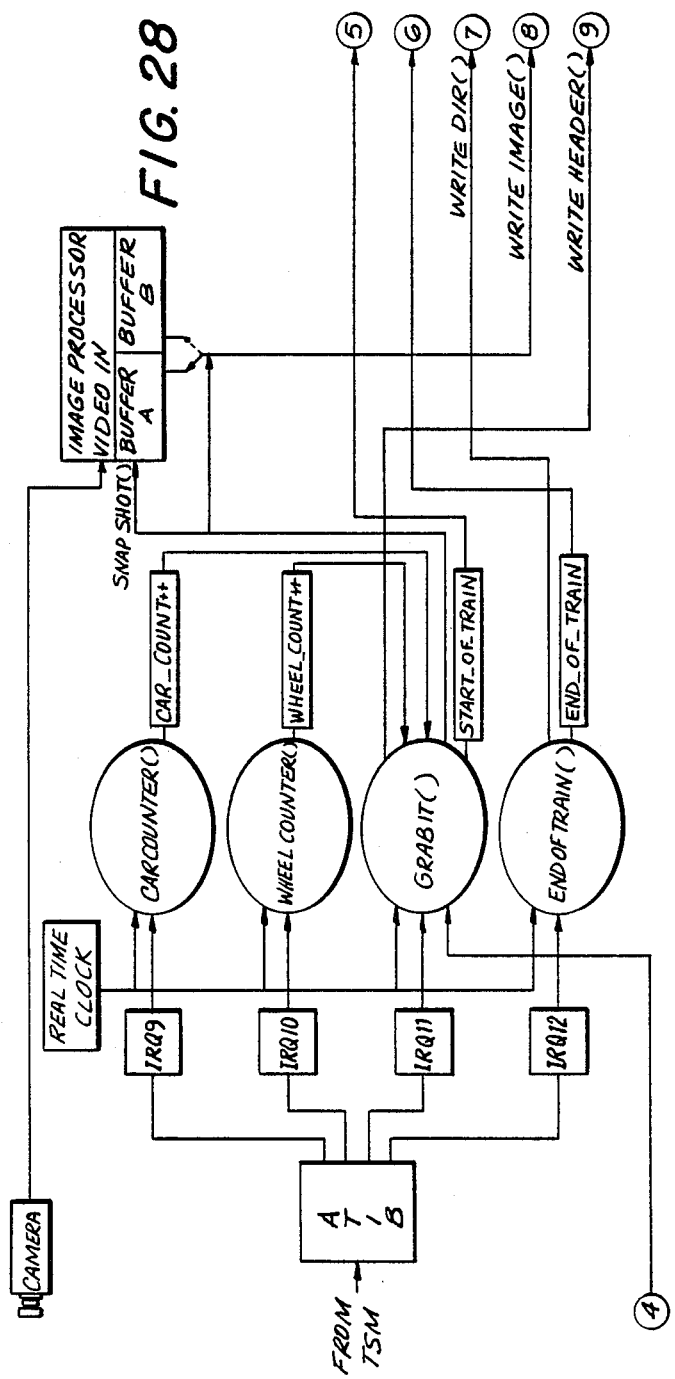
FIG. 28 is a schematic diagram of additional illustrative software suitable for execution on the computers shown in FIG. 6 or the trackside computers shown in FIG. 11.

FIG. 28 is a schematic diagram of the data acquisition portion of the software which runs on computer 256 in either FIG. 6 or FIG. 11. The TSM referred to in FIG. 28 is the associated trackside master board, and the ATIB is the AT interface board shown in FIG. 19. IRQ9-12 correspond respectively to interrupts 9-12 in FIG. 19. Each of the ellipses in FIG. 28 (e.g., the ellipse labelled CarCounter()), represents the portion of the software for producing the indicated output information (e.g., the value of a car count or wheel count variable or the state of a start of train or end of train flag). The output of the real time clock is an input to each of these portions of the software so that each event (e.g., a new car or wheel count) can be tagged with the concurrent real time. The output from circle 4 is an input to the GrabIt( ) routine so that the concurrent weighing scale reading can be associated with each still video image. The image processor shown in FIG. 28 corresponds to digital imager 254 in FIG. 6 or FIG. 11. WriteDir( ) refers to the write directory routine which updates the train directory on the associated disc memory 52 in FIG. 6 or 11 at the end of each train. WriteImage( ) refers to the write image routine which writes a new image (minus the first line mentioned below) to the associated disc memory 52. WriteHeader( ) refers to the write header routine which writes the data encoded in the first line of the image to the associated disc memory 52.

Figure 29:
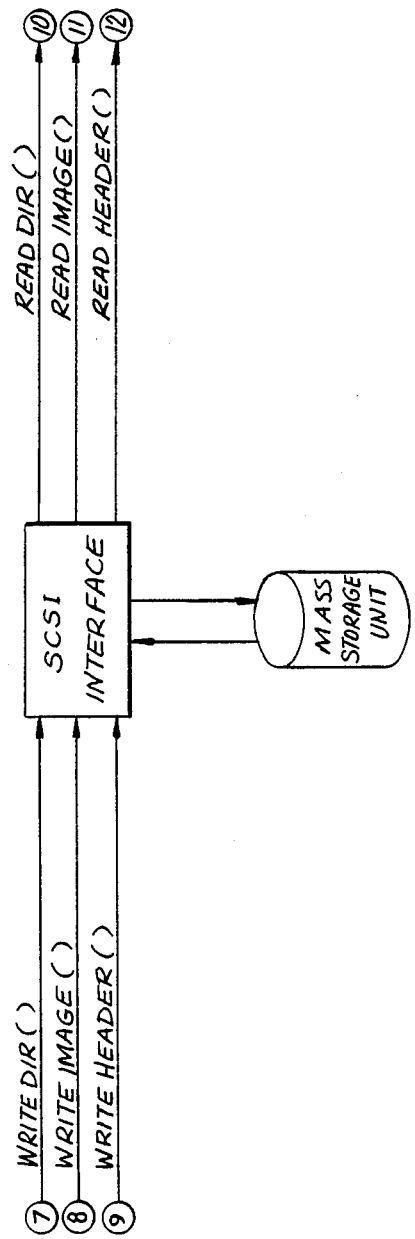
FIG. 29 is a schematic diagram of still more illustrative software suitable for execution on the computers shown in FIGS. 6 and 11.

FIG. 29 is a schematic diagram of the data management portion of the software that runs on computer 256 in FIG. 6 or 11. (Similar data management software runs on computer 356 in FIG. 11.) The depicted mass storage unit corresponds to disc memory 52. The SCSI interface (which stands for small computer system interface) is a standard or conventional disc controller or disc manager for communicating with a so-called hard disc in small computer systems such as personal computers.

Figure 30:
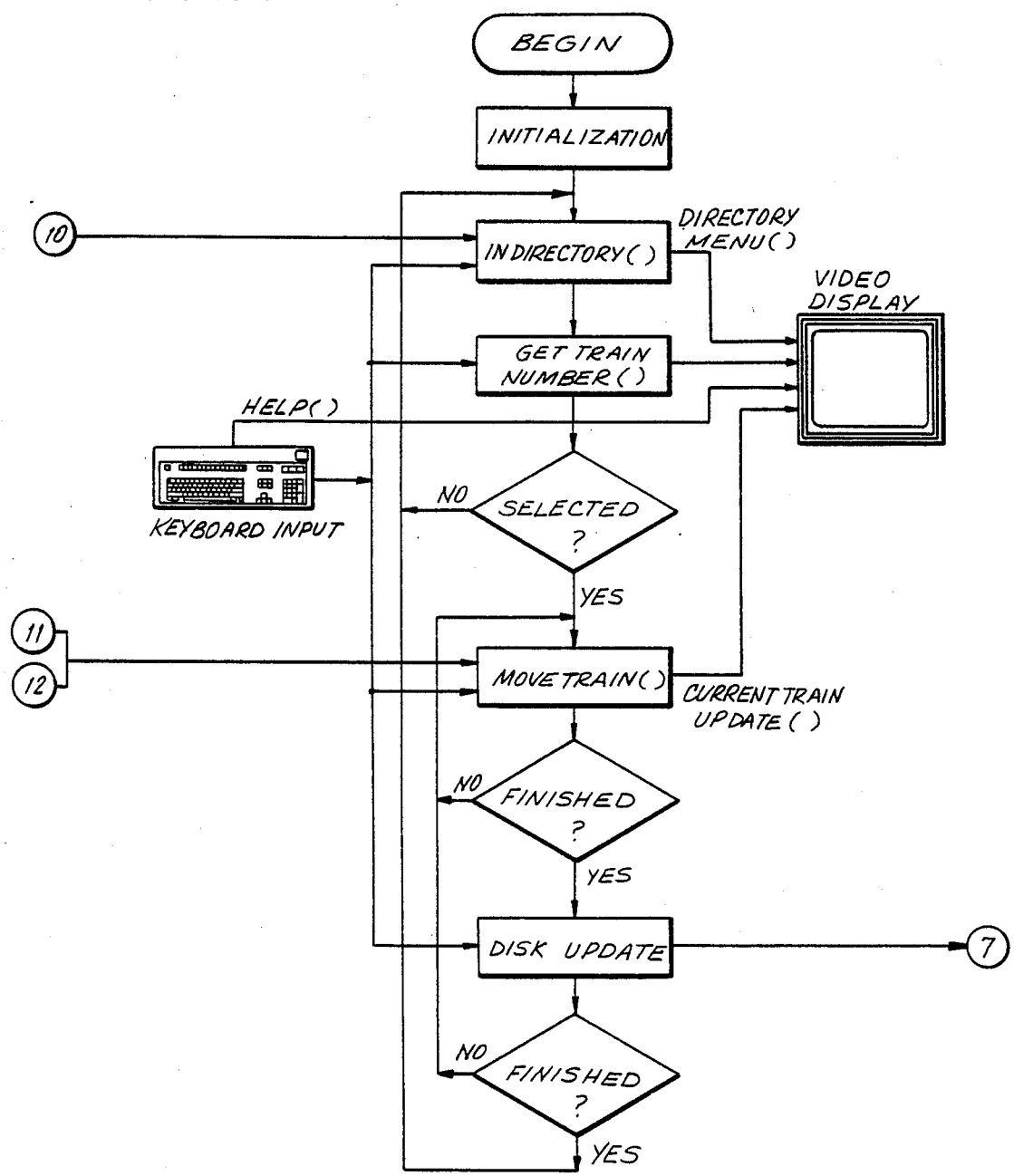
FIG. 30 is a flow chart of still more illustrative software suitable for execution on the computers shown in FIG. 6.

FIG. 30 is a flow chart of the main program which runs on computer 256 in the system of FIG. 6. The keyboard and video display shown in FIG. 30 correspond respectively to keyboard 112 and monitor 150 in FIG. 6. The InDirectory( ) routine is the software that controls the display of the train directory and facilitates operator selection of the train to be viewed (e.g., by allowing the operator to scroll the directory display up or down and to move the cursor on the display). The GetTrainNumber( ) routine is the software that responds to selection of the train to be viewed, which selection can be made either by using the keyboard to enter the train number or by moving the cursor to the desired train number and pressing the enter key on the keyboard. When a train selection is made, the MoveTrain( ) software controls the display of the images for the selected train. The first diamond labelled finished monitors any indication from the operator that he or she is finished viewing the images for a train, which indication can be initiated by the operator pressing the escape key on the keyboard. When such an indication is received, the disk update software modifies the directory information for that train to indicate that the images of that train have been viewed. The second diamond labelled finished gives the operator an opportunity to change his or her mind about whether he or she is finished with that train.

Figure 31:
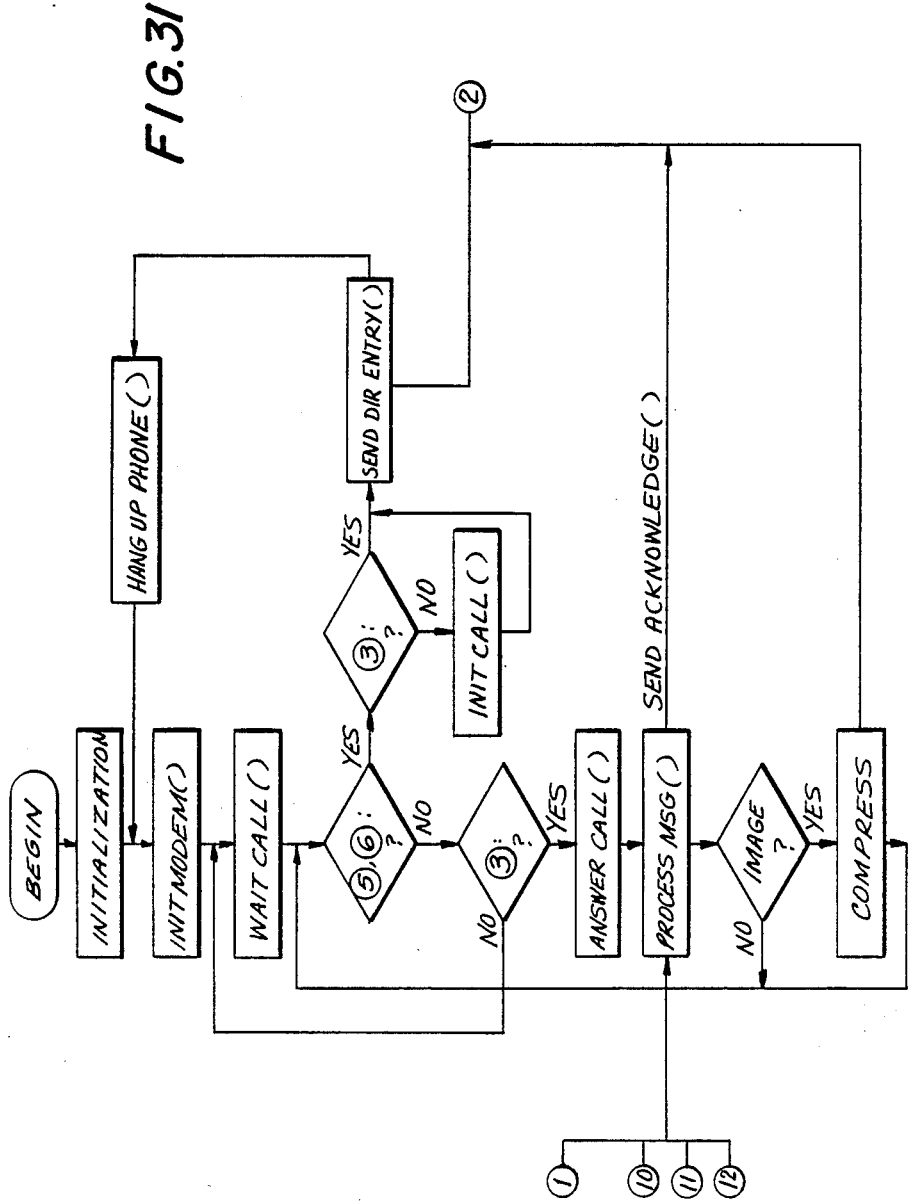
FIG. 31 is a flow chart of still more illustrative software suitable for execution on the trackside computers shown in FIG. 11.

FIG. 31 is a flow chart of the main program that runs on computer 256 in the system of FIG. 11. The InitModem( ) routine initializes modem 60. The WaitCall( ) routine monitors modem 60 for an incoming call. The diamond enclosing circles 5 and 6 tests whether or not the start of train or end of train flag has been set. If so, the diamond to the right of that diamond tests whether or not modem 60 is connected to modem 122. If so, the SendDirEntry( ) routine is performed to send a message via line 80 to alert the remote apparatus 350 (FIG. 11) to the fact that a new train is either being recorded or has been recorded. If modem 60 is not already connected to modem 122, the InitCall( ) routine is performed to establish such a connection, and then the SendDirEntry( ) routine is performed. After the appropriate message has been sent via line 80, the HangUpPhone( ) routine is performed to break the connection between modems 60 and 122.

If the test of circles 5 and 6 is negative, then the diamond below the diamond containing circles 5 and 6 tests whether or not a connection has been made between modems 60 and 122 (e.g., because a call has just come in from remote apparatus 350 in FIG. 11). If not, the program loops back to the WaitCall( ) routine. If so, the AnswerCall( ) and ProcessMsg( ) routines are performed. The latter of these routines processes and responds to the incoming message. Circle 1 (from FIG. 27) represents the incoming message, while circles 10-12 (from FIG. 29) are the data retrieved from the disc memory 52 associated with the computer 256 running this program. The image diamond determines whether or not the message is a request for transmission of an image. If so, the appropriate data compression is performed on the image data before it is applied to circle 2 for transmission via line 80 as shown in FIG. 27.

Figure 32:
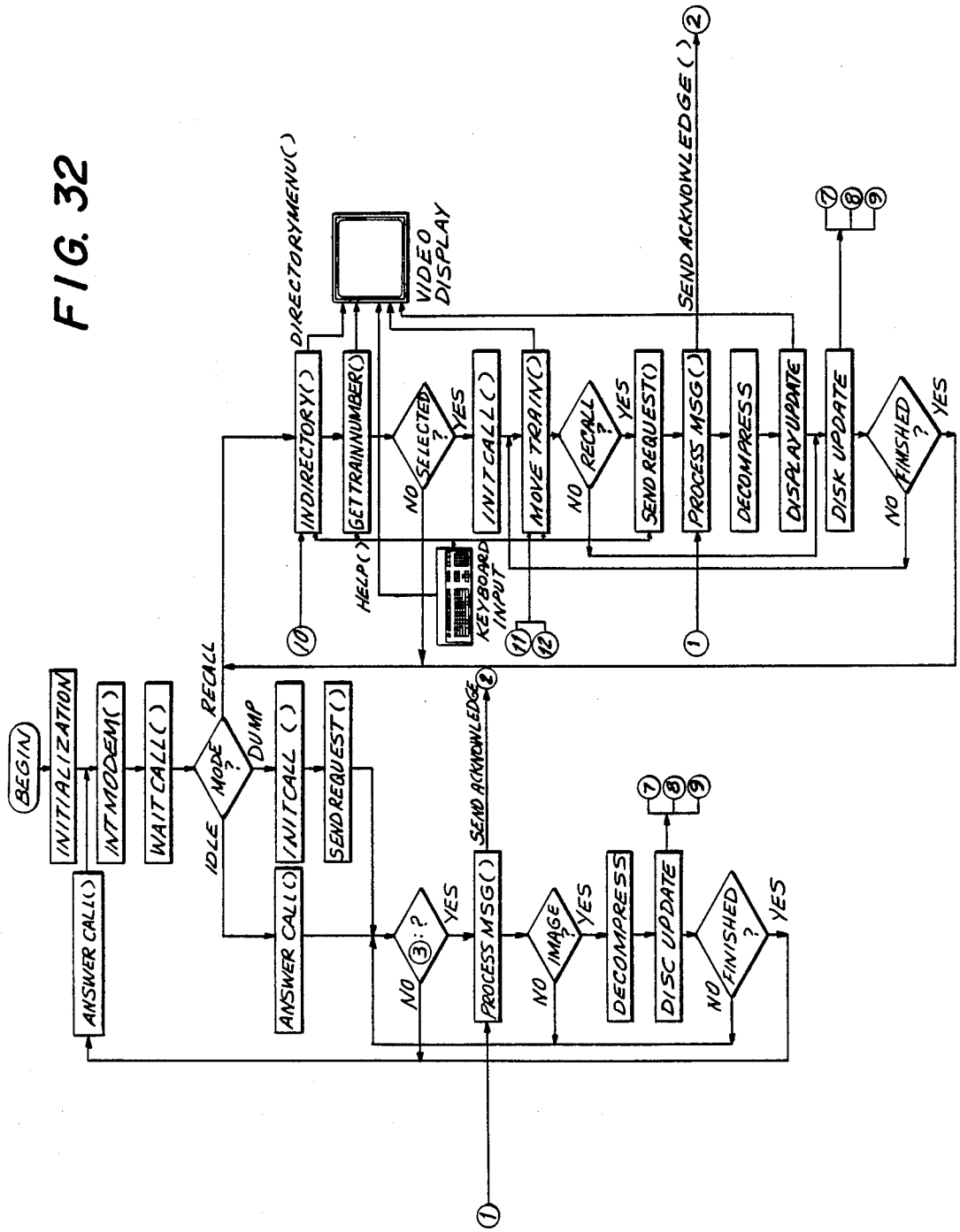
FIG. 32 is a flow chart of still more illustrative software suitable for execution on the computers near the operator's location in the system shown in FIG. 11.

FIG. 32 is a flow chart of the main program running on computer 356 in FIG. 11. It will be noted that the left-hand portion of this flow chart is somewhat similar to FIG. 31, while the right-hand portion is somewhat similar to FIG. 30. Elements that are repeated from these earlier FIGS. will not be described again in connection with FIG. 32.

The mode diamond indicates that this program has three basic parts or modes: (1) the recall mode in which the operator is using the apparatus to view train images, (2) the dump mode in which image data is being transferred from trackside disc memory 52 to operator equipment disc memory 160, and (3) the idle mode in which the apparatus is merely waiting for a call from the trackside equipment. The SendRequest( ) routine formulates the request to be sent to the trackside equipment to request an image data dump from disc memory 52 to disc memory 160. If the message received from the trackside equipment (circle 1) is image data, then the decompress and disc update functions are performed to appropriately decompress the image data and to store the decompressed data in disc memory 160.

In the recall mode, as soon as a train is selected for viewing, the InitCall( ) routine is performed to establish a connection between modems 60 and 122 so that if additional information is needed from disc memory 52 for any image, the connection 80 is already established for transmitting that additional information. The diamond labelled recall is the portion of the program that monitors operator requests for additional information regarding the image currently being displayed. (In this context, recall means upgrade the image currently being displayed by sending more image data from the trackside equipment. This use of the word recall is not to be confused with recall mode, the meaning of which is explained above.) If the operator has requested additional information for an image, then the SendRequest( ) routine is performed to send an appropriate request to the trackside equipment. The decompress and display update functions are then performed on the additional image information received from the trackside equipment.

The protocol used for communication between computers 256 and 356 in FIG. 11 is set forth below, followed by examples of two typical communication sessions. In this communications protocol description, "structure" refers to a known (i.e., predetermined) number of bytes of data organized in a known (i.e., predetermined) way. "Calling" refers to the apparatus which originates the message, and "called" refers to the apparatus which responds to the message. "Plane" refers to a bit-plane as that term is described and employed above. "Algorithm" refers to the scheme that will be used to encode and transmit the image data.

COMMUNICATION PROTOCOL USED BETWEEN THE TRANSMITTER AND THE CALLER

(A) GENERAL DESCRIPTION:

All commands are in standard ASCII format and are composed of three parts:
    (i) The header which is composed of two characters
    (ii) The parameters separated by:
        a coma <,> to separate simmilar values
        a semi-colon <;> to separate different values
    (iii) And the terminator which is the CR ' r' code (13 Hex)

Commands are usually acknowledged by sending back the command preceeded by one of the three following qualifiers:
    (i) A - Acknowledged
    (ii) ? - Rejected or refused (illegal command or parameters)
    (iii) R - Request / Report (for password)
    (iv) T - Terminator (indicate end of a group)

(B) COMMANDS DESCRIPTION AND RELATED ANSWERS:

1. Notation used:

| | | | |
|---|---|---|---|
| r | : | CR code 13 Hex message terminator. | |
| cccc | : | byte count number | (%04x). |
| nnnn | : | starting number | (%04x). |
| mmmm | : | ending number | (%04x). |
| pppp | : | planes mask | (%04x). |
| ssss | : | status byte | (%04x). |
| b | : | byte value | (binary). |
| stru | : | structure. | |
| .. | : | repetition. | |
| xxxx | : | Encrypted password question | (%4s [0×20 .. 0×7F]). |
| yyyy | : | Encrypted password answer to xxxx | (%4s [0×20 .. 0×7F]). |
| mesg | : | ASCII string of text (%s [no CR]). | |

2. Description:

| CALLING | CALLED | MEANING |
|---|---|---|
| | RPWxxxx  r | Request Password identification |
| | RSSss  r | Report System status |
| | RMSmsg  r | Report message |
| APWyyyy  r | | Password answer |
| ASS  r | | Status acknowkedge |
| AMS  r | | Message acknowledged |
| QC  r | | Quit Communication |
| QP  r | | Quit Processing |
| QT  r | | Quit current Train processing |
| | AQC  r | Acknowledged |
| | ?QZ  r | Unknown Command |
| MA  r | | Automatic Mode |
| MM  r | | Manual Mode |
| MV  r | | View Mode |
| | AMA  r | Automatic Mode Accepted |
| | ?MV  r | View Mode Refused (Train being Recorded) |
| DA  r | | Active Directory entries request |
| DF  r | | Full Directory entries request |
| | ADAnnnn;stru  r | <nnnn> entry number |
| | :: | <stru> directory structure |
| | TDA  r | Terminator |
| | ADFnnnn;stru  r | |
| | :: | |
| | TDF  r | Terminator |
| ED  r | | Enquire Directory header structure |
| EFnnnn,mmmm  r | | Enquire Frame structure from <nnnn> to <mmmm> |
| ES  r | | Enquire Remote Site Configuration structure |
| ETnnnn  r | | Enquire Train structure |
| | AEDstru  r | Directory structure |
| | AEFnnnn;stru  r | Frame <nnnn> structure |
| | :: | :: |
| | AEFmmmm;stru  r | Frame <mmmm> structure |
| | TEF  r | Terminator |
| | AESstru  r | Remote Site Configuration structure |
| | AETnnnn;stru  r | Train <nnnn> Structure |
| GTnnnn  r | | Get Train (in AUTOMATIC MODE means send all) |
| GFnnnn  r | | Get Frame <nnnn> (with Header) |
| G+nnnn  r | | Get Forward Split Frame <nnnn> |
| G−nnnn  r | | Get Backward Split Frame <nnnn> |
| GPnnnn  r | | Get Plane <nnnn> |
| GWnnnn  r | | Get Wheel <nnnn> |
| | AGTnnnn  r | Train <nnnn> Acknowledged |
| | AGFnnnn;stru  r | Frame <nnnn> with header structure |
| | AG+nnnn  r | Half Frame <nnnn> and <nnnn+1> |
| | AG−nnnn  r | Half Frame <nnnn> and <nnnn−1> |

COMMUNICATION PROTOCOL USED BETWEEN THE TRANSMITTER AND THE CALLER

|  |  |  |
|---|---|---|
|  | AGPnnnn r | Plane <nnnn> |
|  | AGWnnnn,mmmm r | Wheel <nnnn> found on frame <mmmm> |
|  | AGBccccb..b r | Block <cccc> count, <b...b> byte stream |
|  | TGP r | Terminator |
| RS r |  | Report System Status |
|  | ARSssss r | System status |
| SAnnnn r |  | Set Algorithm number |
| SCstru,stru r |  | Set Clock <CMOS & SYSTEM> Time, Data |
| SFnnnn,ssss r |  | Set Frame status |
| SMmesg r |  | Send message |
| SPpppp r |  | Set Planes mask (tells which planes will be sent after the command GFnnnn r) |
| STnnnn,ssss r |  | Set Train status |
| SWnnnn,mmmm r |  | Set Window's upper and lower limits |
|  | ?SAnnnn r | Unknown Algorithm number |
|  | ASC r | Clock Set |
|  | ASFnnnn r | Frame <nnnn> status acknowledged |
|  | ASM r | Message acknowledged |
|  | ASP r | Plane status acknowledged |
|  | ASTnnnn r | Train <nnnn> status acknowledged |
|  | ?SWnnnn,mmmm r | May be out of range |

3. Examples:

(a) In automatic mode and three first planes:
```
    MA   r
                AMA   r
    DA   r
                ADAnnnn,stru  r
                    ::
                TDA   r
    SA0000  r
                ASA0000  r
    SPE0000  r
                ASP   r
    ETnnnn  r
                AETnnnn,stru  r
    GTnnnn  r
                AGTnnnn  r
                    AGF0000;stru  r
                        ::  AGP0007  r
                        ::    ::       AGBccccb...b  r
                        ::    ::       ::::::::
                        ::    ::       AGBccccb..b   r
                        ::  TGP  r
                        ::  AGP0004  r
                        ::  TGP  r
                    TGF  r
                    AGFmmmm;stru  r
                        ::
                    TGF  r
                TGT  r
    QC   r
                AQC  r  (Hang Up)
```
(b) In manual mode and all planes:
```
    MM   r
                AMM   r
    DA   r
                ADAnnn,stru  r
                    ::
                TDA   r
    SP00FF  r
                ASP   r
    GT0032  r
                AGT0032  r
    GF0000  r
                AGF0000;stru  r
                    AGP0007  r
                        ::  AGBccccb..b   r
                        ::   ::::::::
                        ::  AGBccccb..b   r
                    TGP  r
                    AGP0000  r
                    TGP  r
                TGF  r
    GF0001  r
                AGF0001;stru  r
                    AGP0007  r
                        ::  AGBccccb..b   r
                        ::   ::::::::
    SW0040,0230  r
                ASW0040,0230  r
```

-continued
COMMUNICATION PROTOCOL USED BETWEEN THE TRANSMITTER AND THE CALLER

```
GF0001  r
         AGF0001;stru  r
                  AGP0007  r
                        ::     AGBccccb..b  r
                        ::        ::::::::
GW0006  r
         AGW0006,0010  r
         AGF0010;stru  r
                  AGP0007  r
                        ::     AGBccccb..b  r
                        ::        ::::::::
                        ::     AGBcccb..b  r
                  TGP  r
                  AGP000  r
                  TGP  r
         TGF  r
ST0032,0001  r
         AST0032  r
QT  r
         AQT  r (Return to Idle Mode)
```

Listings of illustrative computer programs suitable for use in connection with the systems of FIGS. 6 and 11 are included in the Appendix to this specification. These computer program listings are explained by the flow charts described above.

While the invention has been described in the context of illustrative embodiments intended for use in facilitating the identification of railroad freight cars, it will be apparent to those skilled in the art that the invention has many other possible applications. For example, the invention can be used in many types of inspection, surveillance, and/or recognition applications such as in the security or protection field (e.g., bank, store, or office surveillance), traffic monitoring or control, and manufacturing process product inspection. The invention also has application in such areas as video teleconferencing, video-augmented telephone communications, etc. Still other applications within the scope of this invention will occur to those skilled in the art. Even within the context of freight car identification systems, it will be apparent to those skilled in the art that the above-described embodiments are merely illustrative, and that various modifications can be made without departing from the scope and spirit of the invention. For example, although the hardware and software illustrated by FIGS. 12–32 and the Appendix are specifically adapted for systems of the type shown in FIGS. 6 and 11, it will be apparent that similar principles are applicable to the details of systems of the type shown in FIGS. 1 and 2, and it will be readily apparent to those skilled in the art how to employ (or modify and employ) that detailed information in systems of the type shown in FIGS. 1 and 2 if desired. As another example of modifications that can be readily implemented by those skilled in the art without departing from the scope and spirit of the invention, while certain data compression techniques have been mentioned above, many other such techniques are known and can be employed if desired.

We claim:

1. Apparatus for remote observation of objects comprising:

first means adjacent the objects for periodically generating data representative of an image of said objects, said data being broken into segments, each of which represents an element of said image;

second means adjacent said objects for transmitting to said point of observation the most significant portion of the data segment associated with each image element;

third means adjacent said point of observation for receiving said most significant portions and for displaying an image based on said most significant portions;

fourth means adjacent said point of observation for transmitting to the location of said objects a first signal indicative of the acceptabilty of the image displayed by said third means;

fifth means adjacent said objects for receiving said first signal and for transmitting to said point of observation the next most significant portion of the data segment associated with each image element only if said first signal indicates that the image displayed by said third means is not acceptable; and sixth means adjacent said point of observation for receiving said next most significant portions and for displaying an image based on said most and next most significant portions of said next most significant portions are transmitted;

wherein said objects move relative to said first means so that a portion of an object feature to be observed may be in one image and another portion of said object feature may be in the next sequential image, and wherein said apparatus further comprises:

first and second buffer means adjacent said point of observation, each of said buffer means being large enough to hold all of th data for one image;

means for storing the data received from said second and fifth means for successive images in alternate ones of said first and second buffers so that the data for two sequential images is respectively stored in said first and second buffers; and means for displaying an image based on part of the data stored in said first buffer and part of the data stored in said second buffer so that both portions of said object feature are visible in the displayed image.

2. Apparatus for remote observation of objects which are the sides of freight cars in a moving freight train comprising:

first means adjacent the objects for determining the speed of said freight train and for periodically generating data representative of an image of said objects, the images for which said first means generates data being substantially mutually exclusive and collectively exhaustive of the length of the train, and the data for each image being broken into segments, each of which represents an element of said image;

second means adjacent said objects for transmitting to said point of observation the most significant portion of the data segment associated with each image element;

third means adjacent said point of observation for receiving said most significant portions and for displaying an image based on said most significant portions;

fourth means adjacent said point of observation for transmitting to the location of said objects a first signal indicative of the acceptability of the image displayed by said third means;

fifth means adjacent said objects for receiving said first signal and for transmitting to said point of observation the next most significant portion of the data segment associated with each image element only if said first signal indicates that the image displayed by said third means is not acceptable;

sixth means adjacent said point of observation for receiving said next most significant portions and for displaying an image based on said most and next most significant portions if said next most significant portions are transmitted; and seventh means adjacent said objects for receiving said first signal and for causing said second means to perform its function with respect to another image of said objects if said first signal indicates that the image displayed by said third means is acceptable;

wherein the observer wishes to be able to read the car-identifying information painted on the side of each car at vertical locations dependent on the type of car, and wherein the apparatus further comprises:

eighth means adjacent said point of observation for allowing the observer to indicate the type of car being observed;

ninth means responsive to said eighth means for transmitting to the location of said objects a second signal which is a function of the indicated type of car; and tenth means adjacent said objects for receiving said second signal and for causing said second means to transmit only data regarding the vertical portion of the image in which car-identifying information occurs on the indicated type of car.

3. Apparatus for remote observation of objects which are the sides of freight cars in a moving freight train comprising:

first means adjacent the objects for determining the speed of said freight train and for periodically generating data representative of an image of said objects, the images for which said first means generates data being substantially mutually exclusive and collectively exhaustive of the length of the train, and the data for each image being broken into segments, each of which represents an element of said image;

second means adjacent said objects for transmitting to said point of observation the most significant portion of the data segment associated with each image element;

third means adjacent said point of observation for receiving said most significant portions and for displaying an image based on said most significant portions;

fourth means adjacent said point of observation for transmitting to the location of said objects a first signal indicative of the acceptability of the image displayed by said third means;

fifth means adjacent said objects for receiving said first signal and for transmitting to said point of observation the next most significant portion of the data segment associated with each image element only if said first signal indicates that the image displayed by said third means is not acceptable;

sixth means adjacent said point of observation for receiving said next most significant portions and for displaying an image based on said most and next most significant portions if said next most significant portions are transmitted; and seventh means adjacent said objects for receiving said first signal and for causing said second means to perform its function with respect to another image of said objects if said first signal indicates that the image displayed by said third means is acceptable;

wherein the observer wishes to be able to read the car-identifying information painted on the side of each car at horizontal locations dependent on the type of car, and wherein the apparatus further comprises:

eighth means adjacent said point of observation for allowing the observer to indicate the type of car being observed;

ninth means responsive to said eighth means for determining which image after an image containing car-identifying information will contain the car-identifying information for the next car based on the horizontal field of view of each image and the type of car being observed; and tenth means adjacent said objects for causing said second means to transmit data regarding the image identified by said ninth means after the observer indicates that the image displayed by said third means contains car-identifying information.

4. The method of monitoring a scene in the field of view of a video camera, said scene changing over time, and said video camera producing a video output signal representative of successive images of said scene, said method comprising the steps of:

digitizing said video output signal to produce a digital output signal representative of said successive images;

periodically producing a first control signal, the time interval between occurrences of said first control signal being substantially greater than the time required for said video camera to produce the output signal representative of one image of said scene;

applying said digital output signal to one of first and second digital memories, each of which is capable of storing said digital output signal representative of one image of said scene, and switching the application of said digital output signal from one to the other of said first and second memories in response to each occurrence of said first control signal; and transferring the digital output signal stored by the one of said first and second memories to which said digital output signal is not currently being applied to a third digital memory, said transferring step being repeated in response to each occurrence of said first control signal so that successive images of said scene are stored in said third memory in digital data form.

5. The method defined in claim 4 wherein said scene includes an object moving relative to said video camera in a direction across said field of view, said object being larger than said field of view parallel to said direction of motion, and wherein said step of periodically producing a first control signal includes the steps of:
   monitoring the motion of said object relative to said video camera; and
   producing said first control signal each time a predetermined amount of relative motion has occurred.

6. The method defined in claim 5 wherein said first control signal is produced each time the amount of motion of said object relative to said video camera is approximately equal to said field of view parallel to said direction of motion.

7. The method defined in claim 6 wherein said object is the side of a railroad train moving past said video camera.

8. The method defined in claim 4 wherein said video camera has a periodic scanning cycle, and wherein said method further comprises the step of:
   synchronizing each occurrence of said first control signal with a predetermined point in said scanning cycle.

9. The method defined in claim 6 further comprising the steps of:
   transferring the digital data for successive images from said third memory to alternate ones of first and second buffers, each of which is capable of storing the digital data for one image so that the digital data for two sequential images are respectively stored in said first and second buffers; and
   using portions of the digital data stored in each of said first and second buffers to form a composite image including a portion of the image represented by the digital data stored in each of said first and second buffers.

10. The method defined in claim 9 wherein the portions of said digital data used to form said composite image represent adjacent portions of said two sequential images, and wherein said adjacent portions of said successive images are arranged in said composite image in the same way that they appear in said scene.

11. Apparatus for monitoring a scene in the field of view of a video camera, said scene changing over time, and said video camera producing a video output signal representative of said scene, said apparatus comprising:
   means for digitizing said video output signal to produce a digital output signal representative of said scene;
   first and second digital memory means, each being capable of storing said digital output signal to accumulate said digital output signal values corresponding to an image of said scene;
   third memory means for storing digital output signal values retrieved from either of said first and second memory means;
   means for periodically producing a first control signal, the time interval between occurrences of said first control signal being substantially greater than the time required for said video camera to produce the output signal representative of one image of said scene;
   means for applying said digital output signal to one of said first and second memory means and for switching the application of said digital output signal from one to the other of said first and second memory means in response to each occurrence of said first control signal; and
   means responsive to each occurrence of said first control signal for retrieving the digital signal values stored by the one of said first and second memory means to which said digital output signal is not currently being applied, and for applying the retrieved digital signal values to said third memory means for storage in said third memory means.

12. The apparatus defined in claim 11 wherein said video camera has a focal plane, wherein said scene includes an object moving relative to said video camera in a direction parallel to said focal plane, said object being larger than said field of view parallel to said direction of relative motion, and wherein said means for periodically producing a first control signal comprises:
   means for monitoring the motion of said object relative to said video camera and for producing said first control signal each time a predetermined amount of relative motion has occurred.

13. The apparatus defined in claim 12 wherein said means for monitoring produces said first control signal each time said amount of relative motion is approximately equal to said field of view parallel to said direction of motion.

14. The apparatus defined in claim 13 wherein said object is the side of a railroad train moving past said video camera.

15. The apparatus defined in claim 11 wherein said first and second digital memory means are relatively small, relatively high speed digital memories, and wherein said third digital memory means is a relatively large, relatively slow digital memory.

16. The apparatus defined in claim 15 wherein said third digital memory means is a disc memory.

17. The apparatus defined in claim 11 wherein said video camera has a periodic scanning cycle, and wherein said means for periodically producing said first control signal comprises:
   means for synchronizing each occurrence of said first control signal with a predetermined point in said scanning cycle.

18. The apparatus defined in claim 13 wherein the digital signal values retrieved from each of said first and second memory means and stored in said third memory means represent an image of said scene, wherein a portion of a feature of the object to be monitored may be in one such image and another portion of said feature may be in the next sequential image, and wherein said apparatus further comprises:
   first and second buffer means, each being capable of storing the digital signal values for one image;
   means for sequentially retrieving from said third memory means the digital signal values for sequential images;
   means for storing the digital signal values for sequential images retrieved from said third memory means in alternate ones of said first and second buffers so that the digital signal values for two sequential images are respectively stored in said first and second buffers; and
   means for using portions of the digital signal values stored in each of said first and second buffers to form a composite image including a portion of the image represented by the digital signal values stored in each of said first and second buffers.

19. The apparatus defined in claim 18 wherein the portions of the digital signal values used to form said composite image represent adjacent portions of said scene.

20. The method of monitoring a scene represented by a succession of still images stored in digital data form in a digital memory, said scene including an object moving relative to the vantage point from which said images are taken i a direction parallel to the plane of said images, said object being larger parallel to said direction of motion than the field of view of any one image, and wherein a portion of a feature of the object to be monitored may be in one image and another portion of said feature may be in the next sequential image, said method comprising the steps of:
transferring the digital data for successive images to alternate ones of first and second buffers, each of which is capable of storing the digital data for one image so that the digital data for two sequential images are respectively stored in said first and second buffers; and
using portions of the digital data stored in each of said first and second buffers to form a composite image including a portion of the image represented by the digital data stored in each of said first and second buffers.

21. The method defined in claim 20 wherein successive images represent adjacent, substantially mutually exclusive portions of said object, and wherein the portions of the digital data used to form said composite image represent adjacent portions of successive images.

22. The method defined in claim 21 wherein said adjacent portions of said successive images are arranged in said composite image in the same way that they appear in said scene.

23. Apparatus for monitoring a scene represented by a succession of still images stored in digital data form in a digital memory, said scene including an object moving relative to the vantage point from which said images are taken in a direction parallel to the plane of said images, said object being larger parallel to said direction of motion than the field of view of any one image, and wherein a portion of a feature of the object to be monitored may be in one image and another portion of said feature may be in the next sequential image, said apparatus comprising:
first and second buffer means, each being capable of storing the digital data for one image;
means for retrieving from said digital memory the digital signal values for successive images;
means for storing the digital data for successive images retrieved from said digital memory in alternate ones of said first and second buffers so that the digital data for two sequential images are respectively stored in said first and second buffers; and
means for using portions of the digital data stored in each of said first and second buffers to form a composite image including a portion of the image represented by the digital data stored in each of said first and second buffers.

24. The apparatus defined in claim 23 wherein successive images represent adjacent, substantially mutually exclusive portions of said object, and wherein the portions of the digital data used to form said composite image represent adjacent portions of successive images.

25. The apparatus defined in claim 24 wherein said adjacent portions of said successive images are arranged in said composite image in the same way that they appear in said scene.

26. The method of monitoring a scene in the field of view of a video camera, said scene including an object moving relative to said video camera in a direction across said field of view and being larger than said field of view parallel to said direction of motion, said method comprising the steps of:
periodically producing a first control signal, the time interval between occurrences of said first control signal being substantially greater than the time required for said video camera to produce the output signal for an image of said scene;
storing in digital data form in a digital memory the output signal of said video camera for an image of said scene in response to each occurrence of said first control signal;
transferring the digital data for two successive images from said digital memory to first and second buffers, each of which is capable of storing the digital data for one image, so that each of said first and second buffers stores the digital data for a respective one of said two successive images; and
using portions of the digital data stored in each of said first and second buffers to form a composite image including a portion of the image represented by the digital data stored in each of said first and second buffers.

27. The method defined in claim 26 wherein successive images represent adjacent, substantially mutually exclusive portions of said object, and wherein the portions of the digital data used to form said composite image represent adjacent portions of successive images.

28. The method defined in claim 27 wherein said adjacent portions of said successive images are arranged in said composite image in the same way that they appear in said scene.

29. The method defined in claim 26 wherein said step of periodically producing a first control signal comprises the steps of:
monitoring the motion of said object across said field of view; and
producing said first control signal each time a predetermined amount of motion has occurred.

30. The method defined in claim 29 where said first control signal is produced each time said amount of motion is approximately equal to said field of view parallel to said direction of motion.

31. The method defined in claim 26 wherein said step of storing the output signal of said video camera comprises the steps of:
applying the output signal of said video camera in digital data form to one of first and second digital memories, each of which is capable of storing said digital data for one image of said scene, and switching the application of said output signal from one to the other of said first and second memories in response to each occurrence of said first control signal; and
transferring said digital data stored by the one of said first and second memories to which said output signal is not currently being applied to a third digital memory, said transferring step being repeated in response to each occurrence of said first control signal so that successive images of said scene are stored in said third memory in digital data form.

32. The method defined in claim 26 wherein said object is the side of a railroad train moving across said field of view.

33. Apparatus for monitoring a scene in the field of view of a video camera, said scene including an object moving relative to said video camera in a direction across said field of view and being larger than said field of view parallel to said direction of motion, said apparatus comprising:

means for periodically producing a first control signal, the time interval between occurrences of said first control signal being greater than the time required for said video camera to produce an output signal representative of an image of said scene;

digital memory means for storing in digital data form the output signal of said video camera for an image of said scene in response to each occurrence of said first control signal;

first and second buffer means, each being capable of storing the digital data for one image of said scene;

means for transferring the digital data for two successive images from said digital memory means to said first and second buffer means so that each of said first and second buffer means stores the digital data for a respective one of said two successive images; and means for using portions of the digital data stored in each of said first and second buffers to form a composite image including a portion of the image represented by the digital data stored in each of said first and second buffers.

34. The apparatus defined in claim 33 wheein successive images represent adjacent, substantially mutually exclusive portions of said object, and wherein the portions of the digital data used to form said composite image represent adjacent portions of successive images.

35. The apparatus defined in claim 34 wherein said adjacent portions of said successive images are arranged in said composite image in the same way that they appear in said scene.

36. The apparatus defined in claim 33 wherein said means for periodically producing a first control signal comprises:

means for monitoring the motion of said object across said field of view and for producing said first control signal each time a predetermined amount of motion has occurred.

37. The apparatus defined in claim 36 wherein said means for monitoring produces said first control signal each time said amount of motion is approximately equal to said field of view parallel to said direction of motion.

38. The apparatus defined in claim 33 wherein said digital emory means comprises:

first and second digital memory means for storing the output signal of said video camera in digital data form, each of said first and second memory means being capable of storing said digital data for one image of said scene;

third digital memory means;

means for applying the output signal of said video camera to one of said first and second memory means and for switching the application of said output signal from one to the other of said first and second memory means in response to each occurrence of said first control signal; and means responsive to each occurrence of said first control signal for retrieving the digital data stored by the one of said first and second memory means to which said output signal is not currently being applied, and for applying the retrieved digital data to said third memory means for storage in said third memory means.

39. The apparatus defined in claim 38 wherein said video camera has a periodic scanning cycle, and wherein said means for periodically producing said first control signal comprises:

means for synchronizing each occurrence of said first control signal with a predetermined point in said scanning cycle.

40. The apparatus defined in claim 38 wherein said first and second digital memory means are relatively small, relatively high speed digital memories, and wherein said third digital memory means is a relatively large, reatively slow digital memory.

41. The apparatus defined in claim 40 wherein said third digital memory means is a disc memory.

42. The apparatus defined in claim 33 wherein said object is the side of a railroad train moving across said field of view.

* * * * *

UNITED STATES PATENT AND TRADEMARK OFFICE
CERTIFICATE OF CORRECTION

PATENT NO. : 4,876,597
DATED : October 24, 1989
INVENTOR(S) : Bernard J.J. Roy et al.

It is certified that error appears in the above-identified patent and that said Letters Patent is hereby corrected as shown below:

| Column | Line | |
|---|---|---|
| 9 | 25 | Change "22" to --.22--. |
| 23 | 40 | Change "("KIB")" to --("PKIB")--. |
| 34 | 52 | Change "th" to --the--. |
| 39 | 9 | Change "i" to --in--. |
| 41 | 32 | Change "wheein" to --wherein--. |
| 42 | 8 | Change "emory" to --memory--. |

Signed and Sealed this

Seventh Day of January, 1992

Attest:

HARRY F. MANBECK, JR.

*Attesting Officer*  *Commissioner of Patents and Trademarks*